(12) United States Patent
Ivett

(10) Patent No.: US 11,680,666 B2
(45) Date of Patent: Jun. 20, 2023

(54) CONNECTOR ASSEMBLY

(71) Applicants: FLEXIGAS UKC LTD, Nottingham (GB); Jonathon Lachlan Ivett, Nottingham (GB)

(72) Inventor: Jonathon Lachlan Ivett, Nottingham (GB)

(73) Assignee: FLEXIGAS UKC LTD, Nottingham (GB)

( * ) Notice: Subject to any disclaimer, the term of this patent is extended or adjusted under 35 U.S.C. 154(b) by 72 days.

(21) Appl. No.: 17/250,460

(22) PCT Filed: Jul. 25, 2019

(86) PCT No.: PCT/GB2019/052084
§ 371 (c)(1),
(2) Date: Jan. 25, 2021

(87) PCT Pub. No.: WO2020/021267
PCT Pub. Date: Jan. 30, 2020

(65) Prior Publication Data
US 2021/0172549 A1 Jun. 10, 2021

(30) Foreign Application Priority Data
Jul. 25, 2018 (GB) .................................. 1812111

(51) Int. Cl.
*F16L 9/147* (2006.01)
*F16L 19/02* (2006.01)
(Continued)

(52) U.S. Cl.
CPC ........... *F16L 19/0231* (2013.01); *F16L 9/147* (2013.01); *F16L 19/025* (2013.01); *F16L 19/048* (2013.01);
(Continued)

(58) Field of Classification Search
CPC ....... F16L 9/147; F16L 19/0231; F16L 25/01; F16L 25/0036; F16L 33/01; F16L 33/26; F16L 19/0206
(Continued)

(56) References Cited

U.S. PATENT DOCUMENTS

| 2,946,607 A | 7/1960 | Bauer |
| 4,090,029 A | 5/1978 | Lundeberg |

(Continued)

FOREIGN PATENT DOCUMENTS

| AU | 2011315323 B2 | 1/2017 |
| CA | 1120113 A | 3/1982 |

(Continued)

OTHER PUBLICATIONS

United Kingdom Intellectual Property Office Search Report regarding Application No. GB1812111.1, dated Jan. 22, 2019, 4 pages.
(Continued)

*Primary Examiner* — Zachary T Dragicevich
*Assistant Examiner* — William S. Choi

(57) ABSTRACT

A connector assembly (608) for a length of corrugated tubing (601) having an inner corrugated element (602) and an outer flexible sheath layer (603). The connector assembly (608) comprises a fitting (609) including a fluid-flow passage and an abutment surface (612) for the corrugated tubing (601) to seat thereon; axial loading means operably connectable to the fitting (609), the axial loading means including a connector (613) and a collet (610), the collet (610) having a radially inward protruding clamping element (611) for insertion into a trough (606) of the inner corrugated element (602), and a sheath-contact portion (625) for engaging the outer sheath layer (603), so that, when the connector (613) moves the collet (610) into engagement with the fitting (609), the collet (610) causes the corrugated element (602)
(Continued)

to move onto the abutment surface (612) whilst maintaining engagement with the outer sheath layer (603). The sheath-contact portion (625) is axially positionable between the inner corrugated element (602) and the outer sheath layer (603) of the corrugated tubing (601), in use.

16 Claims, 20 Drawing Sheets

(51) Int. Cl.
 *F16L 19/025* (2006.01)
 *F16L 19/04* (2006.01)
 *F16L 25/00* (2006.01)
 *F16L 25/01* (2006.01)
 *F16L 33/01* (2006.01)
 *F16L 33/26* (2006.01)

(52) U.S. Cl.
 CPC ........... *F16L 25/0036* (2013.01); *F16L 25/01* (2013.01); *F16L 33/01* (2013.01); *F16L 33/26* (2013.01); *Y10T 29/49826* (2015.01)

(58) Field of Classification Search
 USPC .................................................. 285/55, 903
 See application file for complete search history.

(56) References Cited

U.S. PATENT DOCUMENTS

| | | | |
|---|---|---|---|
| 4,189,198 A | 2/1980 | Reichman | |
| 4,437,691 A | 3/1984 | Laney | |
| 4,630,850 A * | 12/1986 | Saka | F16L 25/0036 285/55 |
| 4,801,158 A * | 1/1989 | Gomi | F16L 25/0036 285/55 |
| 4,806,108 A | 2/1989 | Meinhardt | |
| 4,907,830 A | 3/1990 | Sasa | |
| 5,799,989 A | 9/1998 | Albino | |
| 5,929,383 A | 7/1999 | Marik | |
| 6,036,237 A | 3/2000 | Sweeney | |
| 6,092,274 A * | 7/2000 | Foti | F16L 33/26 285/903 |
| 6,173,995 B1 | 1/2001 | Mau | |
| 6,502,866 B1 * | 1/2003 | Hujisawa | F16L 25/0036 285/903 |
| 7,607,700 B2 * | 10/2009 | Duquette | F16L 25/0036 285/903 |
| 7,621,567 B2 | 11/2009 | Duquette | |
| 7,690,695 B2 | 4/2010 | Duquette | |
| 7,900,971 B2 | 3/2011 | Chiu | |
| 7,980,601 B2 * | 7/2011 | Oh | F16L 25/0036 285/903 |
| 8,399,767 B2 | 3/2013 | Duquette et al. | |
| 9,249,904 B2 | 2/2016 | Duquette | |
| 9,371,945 B2 | 6/2016 | Ivett | |
| 9,445,486 B2 | 9/2016 | Duquette | |
| 9,541,225 B2 | 1/2017 | Strunk | |
| 10,119,640 B2 | 11/2018 | Goodson | |
| 10,263,361 B1 | 4/2019 | Gretz | |
| 10,865,919 B2 | 12/2020 | Cole et al. | |
| 2005/0023832 A1 | 2/2005 | Edler | |
| 2005/0285401 A1 * | 12/2005 | Treichel | F16L 33/26 285/903 |
| 2007/0029795 A1 | 2/2007 | Moner | |
| 2007/0273149 A1 | 11/2007 | Duquette et al. | |
| 2008/0012300 A1 | 1/2008 | Duquette | |
| 2010/0209178 A1 | 8/2010 | Oh | |
| 2013/0087381 A1 | 4/2013 | Daughtry et al. | |
| 2013/0118802 A1 | 5/2013 | Dinh | |
| 2014/0145434 A1 | 5/2014 | Oh | |
| 2014/0333066 A1 | 11/2014 | Strunk | |
| 2014/0373694 A1 | 12/2014 | Strunk | |
| 2016/0123506 A1 * | 5/2016 | Strunk | F16L 25/0036 |
| 2016/0339547 A1 | 11/2016 | Duquette et al. | |
| 2018/0224032 A1 * | 8/2018 | Cole | F16L 25/0036 |

FOREIGN PATENT DOCUMENTS

| | | | |
|---|---|---|---|
| CH | 696287 A5 | 3/2007 | |
| CN | 204141117 U | 2/2015 | |
| DE | 1927667 U | 11/1965 | |
| DE | 4105662 A1 | 9/1992 | |
| DE | 20121607 U1 | 1/2003 | |
| EP | 0474114 A2 | 3/1992 | |
| EP | 0545410 A1 | 6/1993 | |
| EP | 0853742 B1 | 11/2001 | |
| EP | 1286097 A2 | 2/2003 | |
| EP | 1097796 B1 * | 4/2003 | |
| EP | 1298376 A2 | 4/2003 | |
| EP | 3088788 A1 | 11/2016 | |
| FR | 2482251 A1 | 11/1981 | |
| FR | 2589979 A1 | 5/1987 | |
| GB | 2178125 B | 7/1989 | |
| GB | 2484480 A | 4/2012 | |
| JP | S60-47986 A | 3/1985 | |
| JP | H10-292888 A | 11/1998 | |
| JP | 2005325933 A | 11/2005 | |
| JP | 2005325934 A | 11/2005 | |
| WO | 9806970 A1 | 2/1998 | |
| WO | 2007139632 A2 | 12/2007 | |
| WO | 2008150469 A1 | 12/2008 | |
| WO | 2012049452 A1 | 4/2012 | |
| WO | 2012168879 A1 | 12/2012 | |

OTHER PUBLICATIONS

International Search Report and Written Opinion regarding International Application No. PCT/GB2019/052084, dated Nov. 19, 2019, 14 pages.
United Kingdom Intellectual Property Office, Search Report dated Jan. 20, 2011 regarding Application No. GB1017131.2, 1 page.
United Kingdom Intellectual Property Office, Examination Report dated Feb. 16, 2015 regarding Application No. GB1017131.2, 2 pages.
International Search Report dated Mar. 6, 2012 regarding International Application No. PCT/GB2011/001465, 4 pages.
International Preliminary Report on Patentability dated Apr. 16, 2013 regarding International Application No. PCT/GB2011/001465, 7 pages.
USPTO Office Action dated Dec. 4, 2014 regarding U.S. Appl. No. 13/878,595, 10 pages.
IP Australia, Patent Examination Report No. 1 dated Feb. 2, 2016 regarding Application No. 2011315323, 3 pages.
Intellectual Property India, Examination Report dated Jan. 17, 2019 regarding Application No. 3202/DELNP/2013, 7 pages.
United Kingdom Intellectual Property Office, Search Report dated Oct. 4, 2018 regarding Application No. GB1806345.3, 2 pages.

* cited by examiner

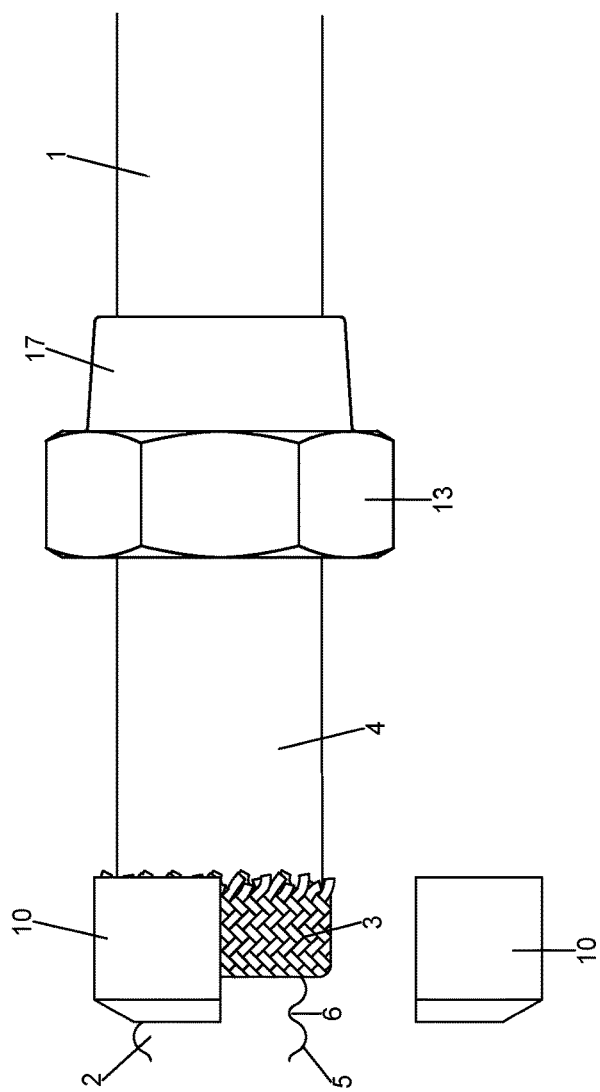
Fig 4A
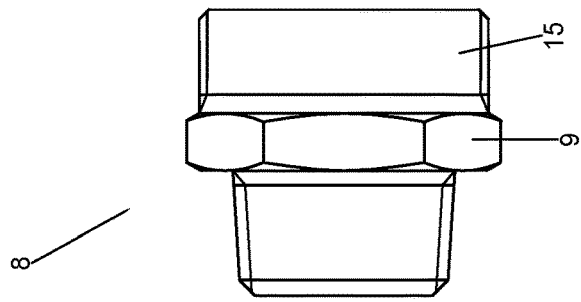

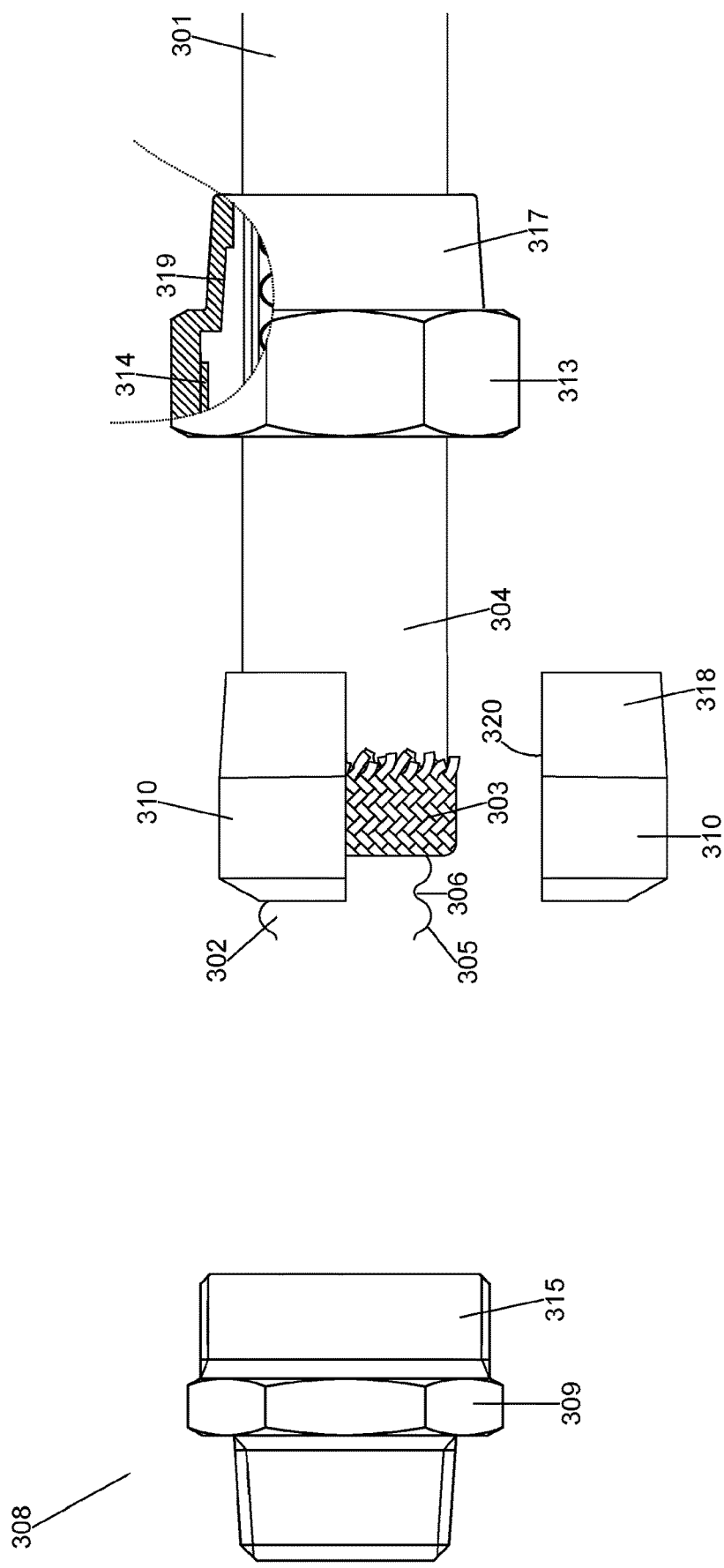

CONNECTOR ASSEMBLY

CROSS REFERENCE TO RELATED APPLICATIONS

This application is a 371 National Stage of International Application No. PCT/GB2019/052084, filed Jul. 25, 2019, which claims priority to United Kingdom Patent Application No. GB1812111.1, filed Jul. 25, 2018, the disclosures of which are herein incorporated by reference in their entirety.

BACKGROUND

Around the world, corrugated stainless steel tubing has become popular for use in plumbing gas fuel lines, primarily in domestic residential homes. More recently stainless steel tubing has become more widespread for use in various other plumbing situations as well. Corrugated stainless steel tubing is well suited for plumbing gas lines, where pressures are typically low, but for plumbing applications where higher pressures are required using corrugated stainless steel tubing can pose unique challenges. As corrugated stainless steel tubing is thin walled and formed into a series of corrugations, it is flexible and can be bent by hand. This also means however that under higher pressures each corrugation may start to expand (without causing the tube to fail or burst) which causes the overall length of a given length of tube to elongate, which is undesirable.

In order that the corrugated stainless steel tubing may withstand higher pressures, it may be provided with an additional layer designed to reinforce the tubing, and prevent expansion of the individual corrugations and thus elongation of the tubing. The reinforcing typically provided is a metal braid, but could also be a plastic/nylon braid. Disadvantageously, where reinforcing braid is used and where the tubing is cut, the braid will become tangled and appear messy. Reinforced corrugated tubing is therefore typically provided in precut lengths with the fittings already attached by the manufacturer, typically seen as flexible gas or high pressure water connectors.

Additionally, in the United States where the use of corrugated stainless steel tubing for gas fuel lines is most common and where local installation standards often do not require the earth bonding of gas pipe installations, manufacturers have had a number of issues with corrugated stainless steel tubing used for gas fuel lines where it interacts with nearby lightning strikes. When lightning strikes a property, or the ground near a property, corrugated stainless steel tubing within the property may become energized. Where metal tubing such as corrugated stainless steel tubing is not adequately and correctly bonded to a potential earth source, arcing from the corrugated stainless steel tubing to other metal objects, may occur. As corrugated stainless steel tubing is thin walled, an electrical current arcing from the corrugated stainless steel tubing to some other electrical path may cause a catastrophic failure in the tubing and potentially cause a gas fire.

Some US manufacturers of corrugated stainless steel tubing have introduced products with additional features designed to better dissipate the electrical energy from a lightning strike should the corrugated stainless steel tubing become energized.

One such embodiment is disclosed in US2006254662. This embodiment includes a conductive plastic polymer designed to better dissipate the energy from a lightning strike.

Another such embodiment is disclosed by US2014333066 and by US2016339547. This embodiment includes an aluminum metal mesh sandwiched between two plastic polymer layers. A specialist cover striper strips the cover so as to expose the metal foil layer, which then makes contact with a non piercing ridge on the inside of the split anvils of the fitting so that electrical continuity exists between the fitting and the aluminum metal layer. One disadvantage of this embodiment is that as the aluminum mesh is manufactured from a significantly different metal to the fittings, with the metal mesh being made from aluminum and the fittings being made from brass, galvanic corrosion can occur where the aluminum makes contact with the brass. Over time, this galvanic corrosion can break the electrical continuity between the aluminum mesh and the brass fitting. A further disadvantage of this embodiment is that as the metal foil layer is made from a thin expanded foil, it provides no reinforcement to the tubing itself, and additionally may break inside the two plastic layers when the tubing is being bent around obstacles. Additionally, as the metal foil layer is sandwiched between two plastic layers it is not movable or flexible along the length of the corrugated tubing, and any attempt to do so would likely break the metal foil layer. Disadvantageously, the method of attaching the fitting to the tubing also requires the installer to strip and remove section of the multiple layers and therefore a specialist stripping tool is required.

Corrugated stainless steel tubing that includes an additional reinforcing metal braid layer would not only reinforce the corrugated stainless steel tubing, allowing it to be used for higher pressures, but would also be effective in dissipating an electrical current, such as a lightning strike. Corrugated stainless steel tubing with a metal braid (with or without a plastic cover) is well known in previous prior art and has been used primarily for flexible gas connectors for many decades for example as disclosed by U.S. Pat. No. 5,383,492A FIG. 8.

Difficulties arise however in methods of neatly attaching a connector assembly to corrugated stainless steel tubing that includes a metal braid or a flexible sheath layer where installation can be done on location at a construction site, rather than by the manufacturer. A connector assembly which could neatly contain a damaged or frayed metal braid, and which prevented the strands of a braid layer from being pulled out from an assembled connector assembly, and additionally where the metal braid maintains electrical continuity between the braid and the connector assembly, would be desirable and advantageous.

SUMMARY

According to a first aspect of the present invention, there is provided a connector assembly for a length of corrugated tubing having an inner corrugated element and an outer flexible sheath layer, the connector assembly comprising: a fitting including a fluid-flow passage and an abutment surface for the corrugated tubing to seat thereon; axial loading means operably connectable to the fitting, the axial loading means including a connector and a collet, the collet having a radially inward protruding clamping element for insertion into a trough of the inner corrugated element, and a sheath-contact portion for engaging the outer sheath layer, so that, when the connector moves the collet into engagement with the fitting, the collet causes the corrugated element to move onto the abutment surface whilst maintaining engagement with the outer sheath layer; wherein the sheath-contact portion is axially positionable between the inner corrugated element and the outer sheath layer of the corrugated tubing, in use.

The radially inward protruding clamping element may be an in-turned edge of the collet and/or may be a finger portion of the collet.

The fitting, the connector, and the collet, when mutually interengaged, may be co-axially aligned, and/or the collet may be clamped between the fitting and the connector.

At least the fitting and the collet may define at least in part an electrically conductive path to the sheath-contact portion.

An axial extent of the sheath-contact portion may overlie at least a peak and trough of the inner corrugated element, in use.

Preferably, the fitting connector may include an inner surface for receiving the collet, opposing surfaces of the fitting connector and collet defining a tapered interengagement.

The collet may include one or more internal gripping elements or one or more inwardly projecting internal gripping protrusions.

The collet may be at least two parts, each part defining the axial extent of the collet.

The first part of the collet may comprise a corrugated-element engagement part having the radially inward protruding clamping element and the second part of the collet may comprise a sheath-layer engagement part having the sheath-contact portion.

The sheath-layer engagement part may be engageable with, and positionable radially inwardly of, the corrugated-element engagement part, in use.

The sheath-layer engagement part may include a head portion engagable with the corrugated-element engagement part and/or a trough of the inner corrugated element therebetween so as to retain the sheath-layer engagement part relative to the corrugated-element engagement part, in use.

The head portion may have retaining means at its proximal end for engaging with an inner surface of the radially inward protruding clamping element and the trough of the inner corrugated element therebetween.

The retaining means may include a plurality of angled teeth that are circumferentially spaced apart.

The sheath-contact portion may be provided distal of the head portion.

The sheath-contact portion may have a tapered distal end to facilitate insertion of the sheath-contact portion between the inner corrugated element and the sheath layer of the corrugated tubing.

The sheath-layer engagement part may have a shoulder between the head portion and the sheath-contact portion for abutting an end of the sheath layer.

The corrugated-element engagement part and the sheath-layer engagement part may be co-axially aligned, in use.

According to a second aspect of the present invention, there is provided a method of connecting corrugated tubing having an inner corrugated element, a flexible outer layer and an outer protective sheath around the outer flexible layer, the method comprising:

placing a connector around the corrugated tubing;

placing a collet partly over the outer protective sheath, a sheath-contact portion of the collet being inserted between the inner corrugated element and the flexible outer layer and engaging the flexible outer layer, a radially inward protruding clamping element of the collet protruding into a trough of an exposed portion of the inner corrugated element; engaging a fitting including a fluid-flow passage with the connector; moving the fitting relative to the connector so that the radially inward protruding clamping element causes the inner corrugated element to contact an abutment surface of the fitting, the sheath-contact portion of the collet maintaining engagement with the flexible outer layer and the radially inward protruding clamping element.

The flexible outer layer may be electrically conductive.

According to a third aspect of the invention, there is provided a method of connecting corrugated tubing having an inner corrugated element and an outer flexible sheath layer, the outer flexible sheath layer comprising an inner electrically conductive sublayer and an outer electrically insulative sublayer, the method comprising: folding back a portion of the outer flexible sheath layer from one end to expose a portion of the inner corrugated element and to expose a portion of the inner electrically conductive sublayer at an outer surface of the outer flexible sheath layer; placing a connector around the corrugated tubing; placing a collet partly over the outer flexible sheath layer, a radially inward protruding clamping element of the collet protruding into a trough of the exposed portion of the inner corrugated element, and a sheath-contact portion of the collet engaging said portion of the inner electrically conductive sublayer of the outer flexible sheath layer; engaging a fitting including a fluid-flow passage with the connector; moving the fitting relative to the connector so that the radially inward protruding clamping element causes the inner corrugated element to contact an abutment surface of the fitting, the sheath-contact portion of the collet maintaining engagement with said portion of the inner electrically conductive sublayer of the outer flexible sheath layer.

According to a fourth aspect, there is provided a connector assembly for a length of corrugated tubing having an inner corrugated element and an outer flexible sheath layer, the connector assembly comprising: a fitting including a fluid-flow passage and an abutment surface for the corrugated tubing to seat thereon; axial loading means operably connectable to the fitting, the axial loading means including a connector and a collet, the collet having a radially inward protruding clamping element for insertion into a trough of the inner corrugated element, and a sheath-contact portion for engaging the outer sheath layer, so that, when the connector moves the collet into engagement with the fitting, the collet causes the corrugated element to move onto the abutment surface whilst maintaining engagement with the outer sheath layer.

The connector assembly allows a cut end of tubing to be finished, sealed and connected to other components as required. The fitting itself is for connecting to other components. In use, the connector and the fitting are connected together and house the collet between them, concealing the collet and axially loading the clamping element against the abutment surface, clamping part of the corrugated element therebetween. This creates a fluid seal. The sheath-contact portion of the collet is in contact with the outer sheath layer. This provides electrical conductivity between the outer sheath layer and the fitting, which allows the tubing to be grounded, decreasing risk of sparking in the event of a lightning strike. The sheath-contact portion provides connection to the outer sheath layer over a larger contact area than would otherwise be the case, reducing the chance of failure of the connection due to galvanic corrosion. The collet also contains and conceals an end portion of the outer sheath layer. This is advantageous because the outer sheath layer may typically be a braided material, which may fray when cut, providing an untidy appearance.

The clamping element may be an in-turned edge of the collet.

The clamping element may be a finger portion of the collet.

The clamping element may be profiled for engaging a trough of the corrugated element.

The collet may axially overlap the fluid-flow passage of the fitting.

The fitting and the connector may each include a threaded portion for mutual engagement.

The fitting, the connector, and the collet, when mutually interengaged, may be co-axially aligned.

When interengaged, the collet may be clamped between the fitting and the connector.

The abutment surface may be flared.

The connector may include a contact surface to abut the collet for axially loading the collet.

At least the fitting and the collet may define at least in part an electrically conductive path to the sheath-contact portion.

The collet may be slidably receivable within the fitting.

The collet may be slidably receivable within the fluid-flow passage of the fitting.

The connector assembly may further comprise a pair of tapered surfaces for clamping the sheath-contact portion to the flexible sheath layer.

An axial extent of the sheath-contact portion may overlie at least a peak and trough of the inner corrugated element, in use.

The connector may include a frusto-conical inner surface.

The collet may include a frusto-conical outer surface.

The fitting may include an inner surface for receiving the collet, opposing surfaces of the fitting and collet defining a tapered interengagement.

The collet may include one or more internal gripping elements.

The internal gripping element may be an inwardly projecting protrusion.

The internal gripping element may be a circumferentially-extending ridge.

The internal gripping element may define a tooth.

There may be at least two said internal gripping elements in axially-spaced apart relationship.

The sheath-contact portion is devoid of protrusion and/or recess.

The collet may be at least two parts. This allows the collet to be assembled over a frayed end of the outer sheath portion.

Each part may define the axial extent of the collet.

Preferably, the first part of the collet may comprise a corrugated-element engagement part having the radially inward protruding clamping element and the second part of the collet may comprise a sheath-layer engagement part having the sheath-contact portion.

The sheath-layer engagement part may be engageable with, and positionable radially inwardly of, the corrugated-element engagement part, in use.

The sheath-layer engagement part may include a head portion engagable with the corrugated-element engagement part and/or a trough of the inner corrugated element therebetween so as to retain the sheath-layer engagement part relative to the corrugated-element engagement part, in use.

The head portion may have retaining means at its proximal end for engaging with an inner surface of the radially inward protruding clamping element and the trough of the inner corrugated element therebetween. Preferably, the retaining means may include a plurality of angled teeth that are circumferentially spaced apart.

The sheath-contact portion may be provided distal of the head portion and may be positionable between the inner corrugated element and the sheath layer of the corrugated tubing, in use.

The sheath-contact portion may have a tapered distal end to facilitate insertion of the sheath-contact portion between the inner corrugated element and the sheath layer of the corrugated tubing.

The sheath-contact portion may have at least one axially extending tail.

The sheath-layer engagement part may have a shoulder between the head portion and the sheath-contact portion for abutting an end of the sheath layer.

The corrugated-element engagement part and the sheath-layer engagement part may be co-axially aligned, in use.

According to a fifth aspect, there is provided a connector assembly according to the fourth aspect, in the form of a kit of parts.

According to a sixth aspect, there is provided a connector assembly according to the fourth aspect, in combination with a length of corrugated tubing having an inner corrugated element and an outer flexible sheath layer, the clamping element of the collet being received in a trough of the inner corrugated element and urged via the connector to fluid-tightly clamp the inner corrugated element to the abutment surface of the fitting whilst the sheath-contact portion of the collet engages the outer flexible sheath layer.

The outer flexible sheath layer may be electrically conductive.

The outer flexible sheath layer may be a metallic braid.

The length of corrugated tubing may include a protective layer disposed around the outer sheath layer.

The protective layer may be formed of an electrically insulating material.

The one or more internal gripping elements of the collet may be adapted and dimensioned to pierce through the protective layer to contact the sheath layer, in use.

An end portion of the outer flexible sheath layer may be folded back to expose the inner corrugated element for engagement with the clamping element of the collet, the connector being dimensioned to accommodate the said folded end portion.

According to a seventh aspect, there is provided a method of connecting corrugated tubing having an inner corrugated element and an outer flexible sheath layer, the method comprising: pulling a portion of the outer flexible sheath layer away from one end to expose a portion of the inner corrugated element; placing a connector around the corrugated tubing; placing a collet partly over the outer sheath layer, a radially inward protruding clamping element of the collet protruding into a trough of the exposed portion of the inner corrugated element, and a sheath-contact portion of the collet engaging the outer sheath layer; engaging a fitting including a fluid-flow passage with the connector; moving the fitting relative to the connector so that the clamping element causes the inner corrugated element to contact an abutment surface of the fitting, the sheath-contact portion of the collet maintaining engagement with the outer sheath layer.

Pulling a portion of the outer flexible sheath layer away from one end to expose a portion of the inner corrugated element allows the clamping element to contact the inner corrugated element directly, while the collet contains and conceals the pulled-back portion.

The method may further comprise an initial step of cutting the corrugated tubing.

According to an eighth aspect, there is provided a method of connecting corrugated tubing having an inner corrugated element and a flexible outer layer, the method comprising: cutting the corrugated tubing; deforming the flexible outer layer to expose a portion of the inner corrugated element; and attaching a fitting to the inner corrugated element, the fitting covering a cut end of the flexible outer layer.

Attaching the fitting to the inner corrugated element allows a fluid-tight seal to be provided between the fitting and the inner corrugated element, and provides a strong connection therebetween. The fitting also covers the cut end of the flexible outer layer. This is advantageous because the cut end may be untidy, particularly if the flexible outer layer is made of a braided material, in which case fraying may occur at the cut end.

The step of deforming the flexible outer layer may include folding the flexible outer layer back on itself along an axial extent of the tubing, away from the cut.

The corrugated tubing may further comprise an outer protective sheath around the flexible outer layer, and the method may further include a step of pulling the outer protective sheath away, or folding the outer protective sheath over on itself to expose a portion of the flexible outer layer.

The flexible outer layer may be electrically conductive.

According to a ninth aspect, there is provided a method of finishing a cut end of a length of corrugated tubing having an inner corrugated element and a flexible outer layer, the method comprising placing a split collet about the end of the flexible outer layer and clamping the split collet to the inner corrugated element.

The split collet covers and conceals the cut end of the flexible outer layer, also protecting it from damage. The fact that the collet is a split collet allows it to be assembled around the cut end conveniently. Clamping the collet to the inner corrugated element is advantageous as it provides a stronger mounting for the collet, and may help to provide a fluid seal in combination with other components.

According to a tenth aspect, there is provided a method of finishing a cut end of a length of corrugated tubing having an inner corrugated layer and a flexible outer layer having an end portion which is at least in part frayed, the method comprising placing a split collet about the end portion of the flexible outer layer to shroud the frayed portion, and clamping the split collet to the corrugated inner layer.

The split collet covers and conceals the cut end of the flexible outer layer, also protecting it from damage. The fact that the collet is a split collet allows it to be assembled around the cut end conveniently. Clamping the collet to the inner corrugated element is advantageous as it provides a stronger mounting for the collet, and may help to provide a fluid seal in combination with other components.

According to an eleventh aspect, there is provided a method of connecting corrugated tubing having an inner corrugated element, a flexible outer layer and an outer protective sheath around the outer flexible layer, the method comprising: placing a connector around the corrugated tubing; placing a collet partly over the outer protective sheath, a sheath-contact portion of the collet being inserted between the inner corrugated element and the flexible outer layer and engaging the flexible outer layer, a radially inward protruding clamping element of the collet protruding into a trough of an exposed portion of the inner corrugated element; engaging a fitting including a fluid-flow passage with the connector; moving the fitting relative to the connector so that the clamping element causes the inner corrugated element to contact an abutment surface of the fitting, the sheath-contact portion of the collet maintaining engagement with the flexible outer layer and the radially inward protruding clamping element.

The above method negates the need to pull back, fold back or remove a portion of the outer protective sheath prior to fitting the collet to the corrugated tubing.

Preferably, the flexible outer layer is electrically conductive.

BRIEF DESCRIPTION OF THE DRAWINGS

In order that the invention may be better understood, the invention will now be more particularly described, by way of example only, with reference to the accompanying drawings, in which:

FIG. 4A shows a side view of a first embodiment of a connector assembly in a disassembled state around the tubing of FIG. 1, in accordance with a third aspect of the present invention;

FIG. 6A shows a partially cross-sectional side view of a third embodiment of a connector assembly in a disassembled state around the tubing of FIG. 1, in accordance with the third aspect of the present invention;

DETAILED DESCRIPTION

Throughout this description proximal refers to a point, location or direction closer to or towards the fitting body and distal refers to a point, location or direction further from or away from the fitting body.

Figure 1:
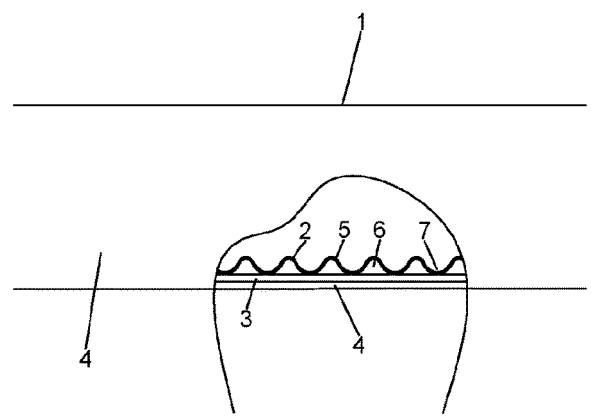
FIG. 1 shows a partially cross-sectional side view of a prior art reinforced corrugated stainless-steel tubing.

Referring to FIG. 1, there is shown a reinforced corrugated tubing segment (reinforced corrugated tubing) 1 consisting of corrugated stainless steel tubing or inner corrugated element (corrugated tubing) 2, a metal braided layer or outer flexible sheath layer 3 and an additional plastic cover 4, as typically seen in prior art. Corrugated stainless steel tubing or the inner corrugated element 2 is made from a thin sheet of stainless steel formed into a series of circumferential corrugations 5. Each corrugation may consist of a circumferential valley or trough 6, and a circumferential peak or ridge 7. The corrugated tubing may be provided with an outer flexible sheath layer or metal braid layer 3 and optionally an additional plastic cover 4. The metal braid layer 3 could either be tightly woven around the inner corrugated element 2 with many strands, or there may instead be a looser configuration of strands. The flexible sheath layer may also be formed thin enough and from a soft enough metal like brass or copper, such that a typical metal wheel pipe cutter can cut through them.

Figure 2:
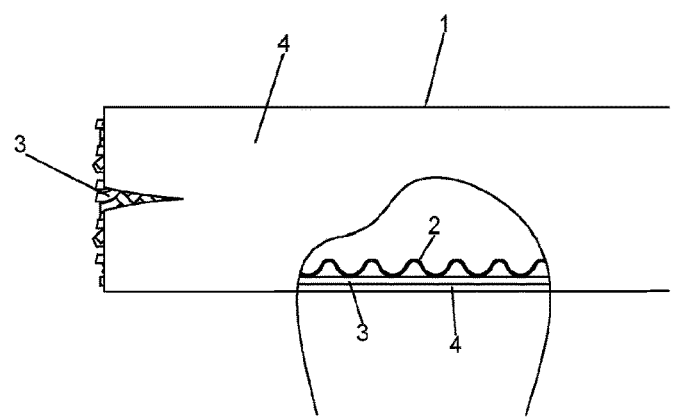
FIG. 2 shows a partially cross-sectional side view of the tubing of FIG. 1, in which a plastic cover of the tubing has been partially removed.

FIG. 2 shows a segment of reinforced corrugated tubing 1 that has been cut by a metal wheel pipe cutter. An axial slit has been made along a portion of the plastic cover or outer protective sheath 4. This may make the folding over of the flexible sheath layer 3 and the outer protective sheath 4 easier.

Figure 3:
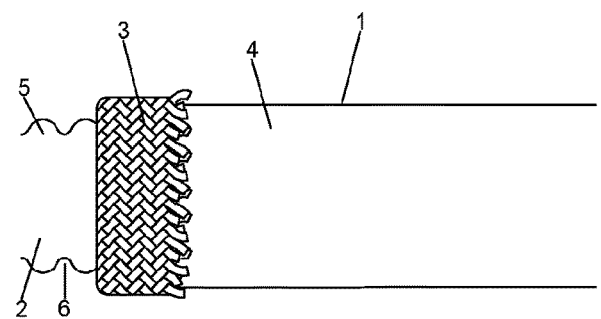
FIG. 3 shows a side view of the tubing of FIG. 1, in which a metal braided layer of the tubing has been folded back over the plastic cover.

FIG. 3 shows the reinforced corrugated tubing of FIG. 2, with a section of the metal braid or flexible sheath layer 3 and the plastic cover 4 folded back on itself so as to expose a number of corrugations 5. As the weaved flexible sheath layer 3 is strong and flexible, this is possible, however folding the flexible sheath layer back on itself may cause it to become tangled and frayed.

Figure 4B:
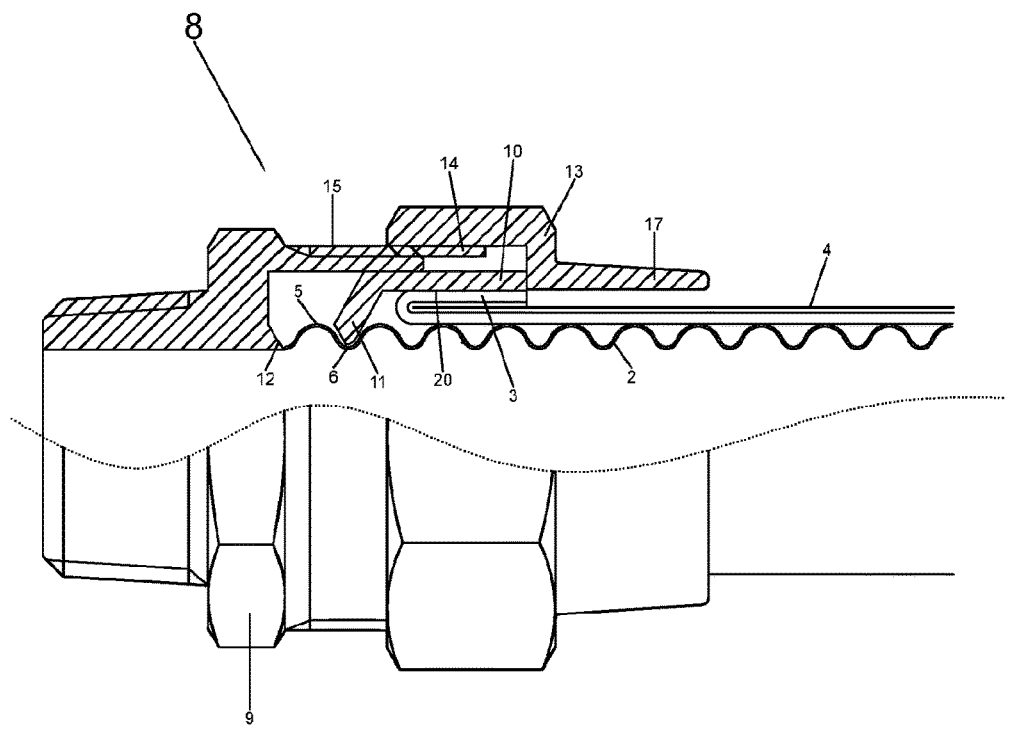
FIG. 4B shows a partially cross-sectional side view of the connector assembly of FIG. 4A in a partially assembled state.
Figure 4C:
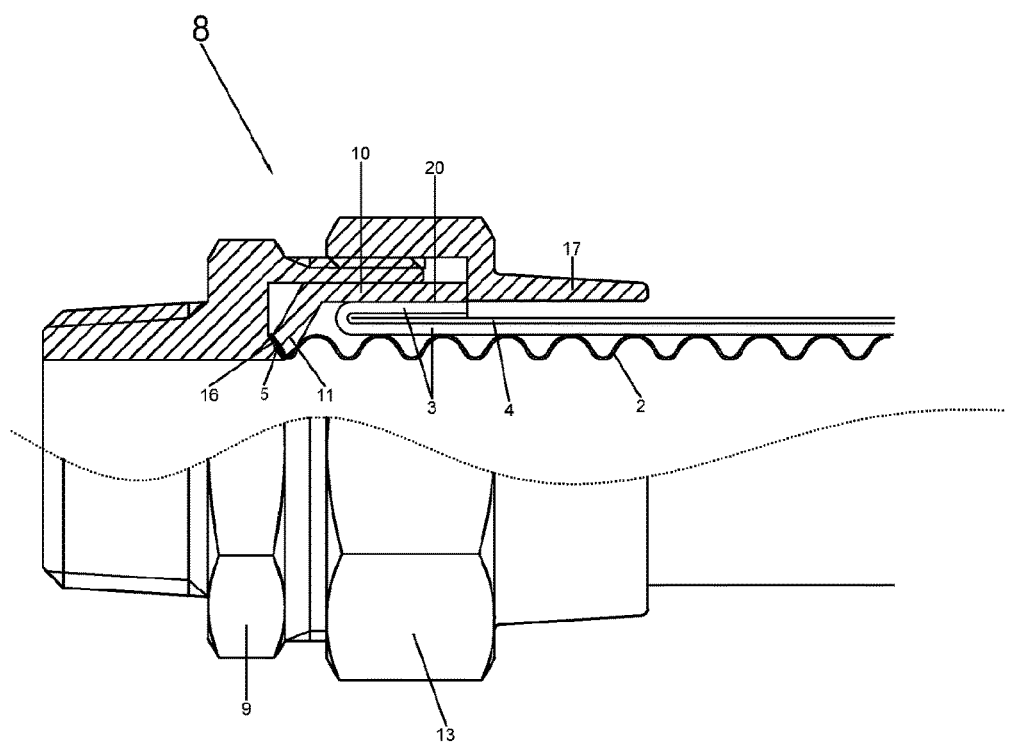
FIG. 4C shows a partially cross-sectional side view of the connector assembly of FIG. 4A in a fully assembled state.

The embodiment shown in FIGS. 4A to 4C show a predominantly cylindrical connector assembly 8, in accordance with the third aspect of the present invention. In use the connector assembly shown is a Male fitting and has one connection for attaching a length of corrugated tubing and a male thread for engagement with a female thread of some other fitting or appliance. It is understood that many other combinations could also be made, such as female, tee, reducing union etc.

The connector assembly 8 comprises a fitting or fitting body 9, a collet or split retaining means element 10, which here further comprises at least one retaining finger or radially inward protruding clamping element 11 which protrudes into the last valley 6 on a cut length of corrugated tubing 2. The clamping element 11 is preferably an in-turned edge of the collet 10. The fitting includes a fluid-flow passage. The collet 10 is preferably a two-part split collet. The connector assembly 8 further includes a sealing face abutment surface or contact surface 12 and a drivable element nut or connector 13 which includes a first engagement element, here an interior female thread or threaded portion 14 which is engageable with a second engagement element, here an exterior male thread or threaded portion 15 radially extending around the outside of the fitting body 9. The collet 10 and connector 13 collectively provide axial loading means.

The collet 10 also preferably includes a sheath-contact portion 20 for engaging the outer flexible sheath layer 3. The collet 10 is preferably slidably receivable within the fluid flow passage of the fitting. An axial extent of the sheath-contact portion 20 preferably overlies at least a peak and trough of the inner corrugated element 2, in use. In this particular embodiment, the sheath-contact portion is devoid of protrusion and/or recess.

The clamping element 11 is preferably profiled for engaging a trough of the corrugated element 2.

FIG. 4A depicts the components of the connector assembly being prepared for the attachment of the connector assembly 8 to the reinforced corrugated tubing 1. Firstly, the reinforced corrugated tubing 1 is cut using a metal wheel pipe cutter. The connector 13 is then put onto the reinforced tubing 1 before part of the reinforcing braid or flexible sheath layer 3 and the plastic cover 4 is then folded back over on itself so as to expose a number of corrugations 5. At this point in the installation process the metal braid or flexible sheath layer 3 will be frayed and messy. The split collets 10 are then assembled so that its retaining finger 11 sits in the trough 6 of the last corrugation 5 of the corrugated tubing 2, but also so that it encapsulates the frayed flexible sheath layer 3. Once the connector assembly 8 is fully installed, the frayed portion will no longer be visible giving a neat appearance.

The assembled collets 10, connector 13 and reinforced corrugated tubing 1 are then partially assembled to the fitting body 9 as depicted in FIG. 4B. Initially, the collets 10 can be inserted into the fitting body 9, and the connector tightened onto the fitting body 9 by finger tightening, as the male 15 and female 14 threads will mate without resistance. As the connector 13 is further tightened onto the fitting body the un-deformed inner corrugated layer 2 will abut the flared abutment surface 12 of the fitting body 9 causing resistance to increase. At this point further tightening must be done by the use of a rotational tool, such as two wrenches or spanners, which engages with the connector 13 and fitting body 9. As torque is applied to the connector and the fitting body, the last corrugation 5 of the corrugated tubing 2 will start to deform and flatten.

FIG. 4C depicts the connector assembly 8 in its final assembled position, and where a seal has been obtained 16. The frayed metal braid layer 3 is neatly held in a folded back position by the split retaining means collet 10, and electrical continuity exists between the metal braid layer 3 and the connector assembly 8. Advantageously a significant length of the metal braid layer 3 is in contact with the collet 8, and the contact portion 20 covers multiple corrugations, significantly reducing the overall chance of galvanic corrosion breaking electrical continuity between the metal braid layer and the connector assembly. Additionally the flexible sheath layer 3 is firmly clamped between the collets 10 and the inner corrugated element 2 ensuring that it cannot easily be pulled out. The collet 10 preferably axially overlaps the fluid-flow passage of the fitting 9. The fitting 9, the connector 13 and the collet 10 are preferably co-axially aligned. The collet 10 is preferably clamped between the fitting 9 and the connector 13.

The fitting 9 and the collet 10 preferably define at least in part an electrically conductive path to the sheath-contact portion.

Optionally, this embodiment may include a drivable nut connector 13 that includes a tail portion 17 which gives an overall neater appearance and may be useful where silicone tape is required for corrosion protection.

A second embodiment of the invention shown in FIG. 5, in accordance with the third aspect of the present invention, shows a connector assembly 208 in which the split retaining element or collets 210 is alignable and seatable within the drivable nut or connector 213 and not the fitting or fitting body 9. This embodiment might be advantageous in reducing the manufacturing cost of the connector assembly as it could be made from smaller brass bar stock than the first embodiment. Advantageously, this second embodiment includes a frusto conical beveled edge 218 which engages with a mating frusto conical surface 219 on the inside of the connector 213, which in use allows for easier insertion of the collets 210, especially when the flexible sheath layer 203 is particularly frayed and therefore preventing the split collets 210 from coming together properly. That is, the split retaining element collets 210 is preferably tapered in an axial direction, and is receivable in a similarly tapered internal space of the connector 213. The connector assembly therefore preferably comprises a pair of tapered surfaces for clamping the sheath-contact portion 220 of the collets 210 to the flexible sheath layer 203. The connector 213 preferably include an inner surface for receiving the collet 210, opposing surfaces of the connector 213 and collet 210 defining a tapered interengagement. In use the connector assembly shown is a Male fitting and has one connection for attaching a length of corrugated tubing and a male thread for engagement with a female thread of some other fitting or appliance. It is understood that many other combinations could also be made, such as female, tee, reducing union etc.

The connector assembly 208 comprises a fitting or fitting body 209, a split retaining means element or collet 210, which here further comprises at least one retaining finger or radially inward protruding clamping element 211 which protrudes into the last valley or trough 206 on a cut length of corrugated tubing or the inner corrugated element 202. The clamping element 211 is preferably an in-turned edge of the collet 210. The fitting includes a fluid-flow passage. The collet 210 is preferably a two-part split collet. The connector assembly 208 further includes a sealing face abutment surface or contact surface 212 and a drivable element nut or connector 213 which includes a first engagement element, here an interior female thread or threaded portion 214 which is engageable with a second engagement element, here an exterior male thread or threaded portion 215 radially extending around the outside of the fitting body 209. The collet 210 and connector 213 collectively provide axial loading means.

The collet 210 also preferably includes a sheath contact portion 220 for engaging the flexible sheath layer 203, which advantageously covers a number of corrugations 205. The collet 210 is preferably slidably receivable within the tail portion 217 of the connector 213.

The clamping element 211 is preferably profiled for engaging a trough of the corrugated element 202.

Figure 5A:
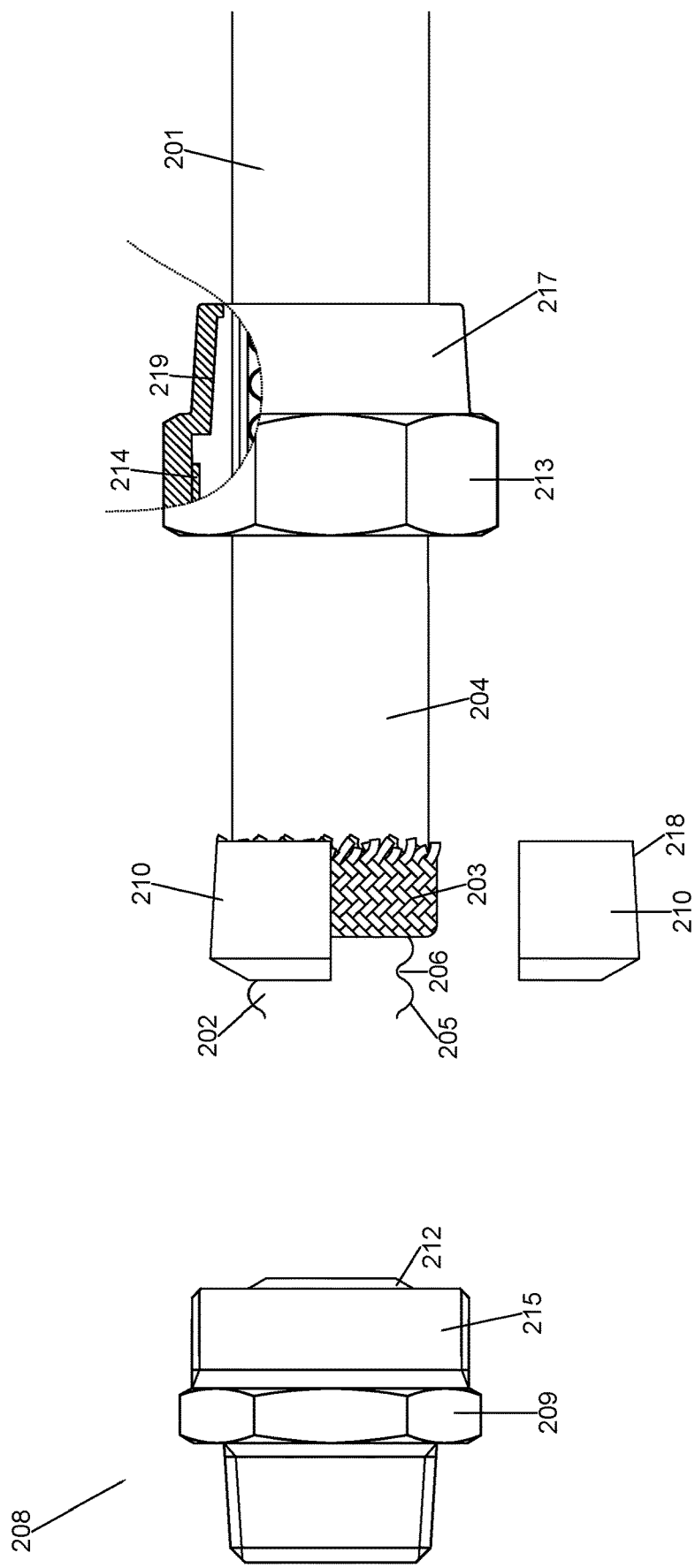
FIG. 5A shows a partially cross-sectional side view of a second embodiment of a connector assembly in a disassembled state around the tubing of FIG. 1, in accordance with the third aspect of the present invention.

FIG. 5A depicts the components of the connector assembly being prepared for the attachment of the connector assembly 208 to the reinforced corrugated tubing 201. Firstly, the reinforced corrugated tubing 201 is cut using a metal wheel pipe cutter. The connector 213 is then put onto the reinforced tubing 201 before part of the flexible sheath layer 203 and plastic cover 204 is then folded back over itself so as to expose a number of corrugations 205. At this point in the installation process the flexible sheath layer 203 will be frayed and messy. The split collet 210 is then assembled so that its retaining finger or inwardly protruding clamping element 211 sits in the valley 206 of the last corrugation 205 of the corrugated tubing element 202, but also so that it encapsulates the frayed metal braid layer 203. Once the connector assembly 208 is fully installed, the frayed portion will no longer be visible giving a neat appearance.

The connector 213 is then pulled over the split collet 210. Advantageously, the collet 210 includes a beveled frusto conical surface 218 which matches a frusto conical shape on the inside of the tail portion 217 of the connector 213. This feature allows the connector 213 to be pulled over the collet 210 more easily, especially where the folded over flexible sheath layer 203 is especially frayed and may be preventing the split collet from properly coming together.

Figure 5B:
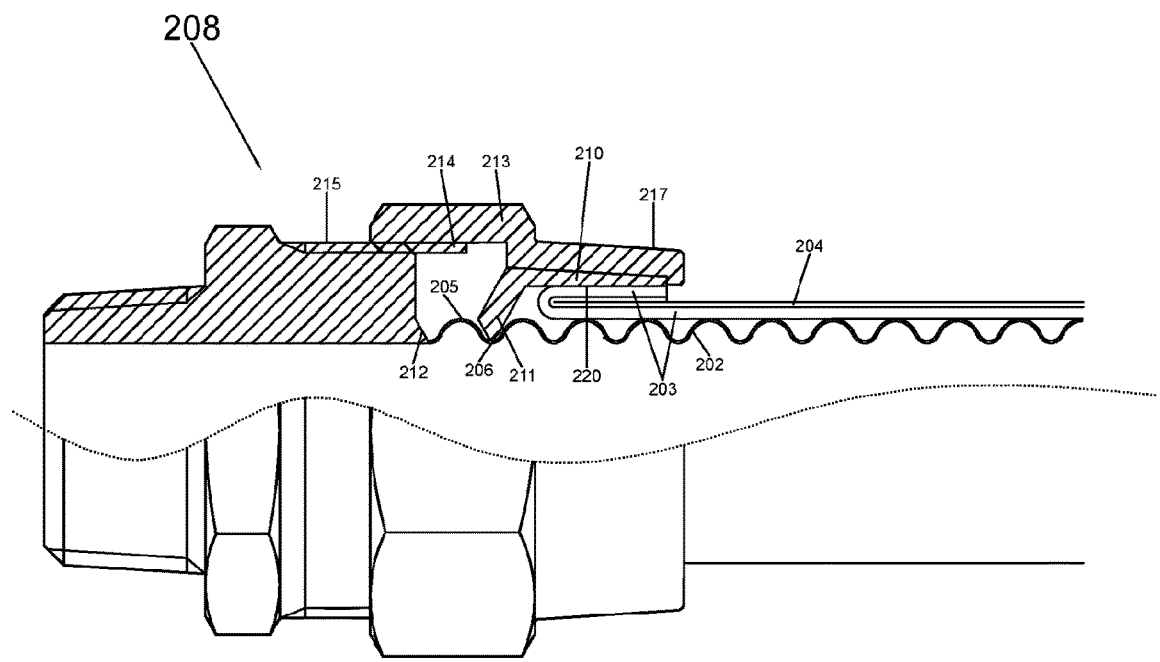
FIG. 5B shows a partially cross-sectional side view of the connector assembly of FIG. 5A in a partially assembled state.

The assembled collet 210, connector 213 and reinforced corrugated tubing 201 are then partially attached to the fitting body 209 as depicted in FIG. 5B. Initially, the connector 213 can be attached to the fitting body by finger tightening, as the male 215 and female 214 threads will mate without resistance. As the connector 213 is further tightened onto the fitting body the un-deformed corrugated tubing 202 will abut the flared abutment surface 212 of the fitting body 209 causing resistance to increase. At this point further tightening must be done by the use of a rotational tool, such as two wrenches or spanners which engages with the connector 213 and fitting body 209. As torque is applied to the connector and the fitting body, the last corrugation 206 of the inner corrugated element 202 will start to deform and flatten.

Figure 5C:
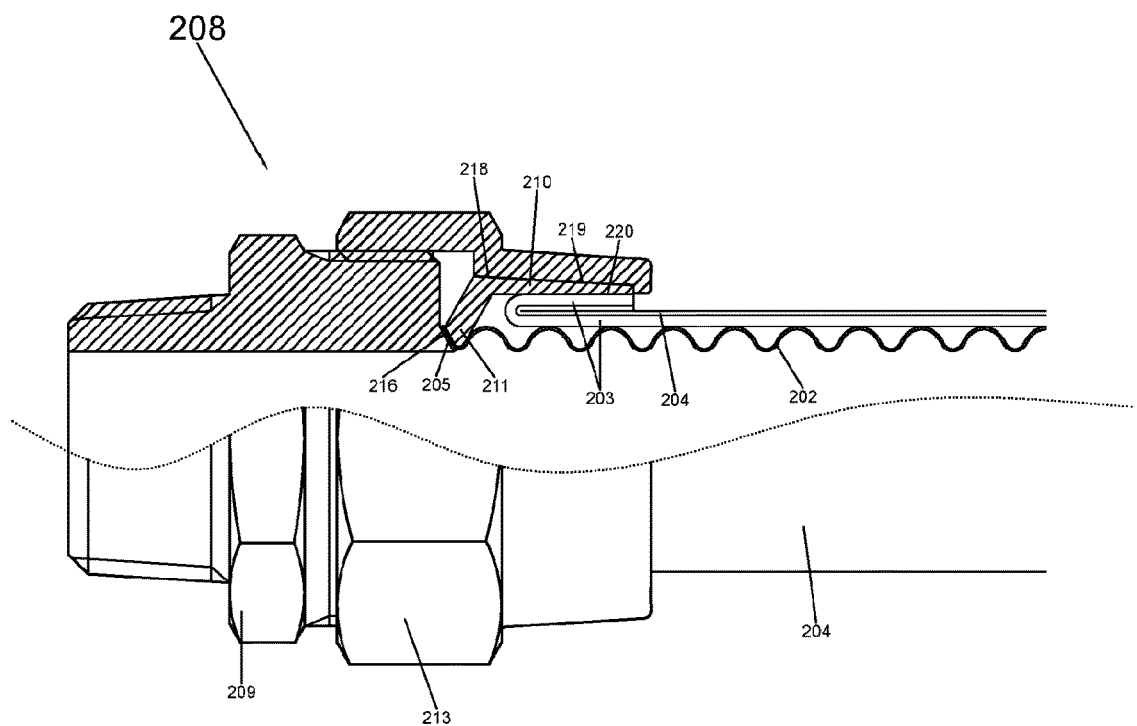
FIG. 5C shows a partially cross-sectional side view of the connector assembly of FIG. 5A in a fully assembled state.

FIG. 5C depicts the connector assembly in its final assembled position, and where a seal 216 has been obtained. The frayed metal braid layer 203 is neatly held in a folded back position by the split retaining means collet 210, and electrical continuity exists between the metal braid layer 203 and the connector assembly 208. Advantageously a significant length of the metal braid is in contact with the connector assembly, and where the sheath contact portion 220 covers multiple corrugations, significantly reducing the overall chance of galvanic corrosion breaking electrical continuity between the metal braid and the connector assembly. Additionally the metal braid layer 203 is firmly clamped between the split retaining means collet 210 and the inner corrugated element 202 ensuring that it cannot easily be pulled out.

Figure 6B:
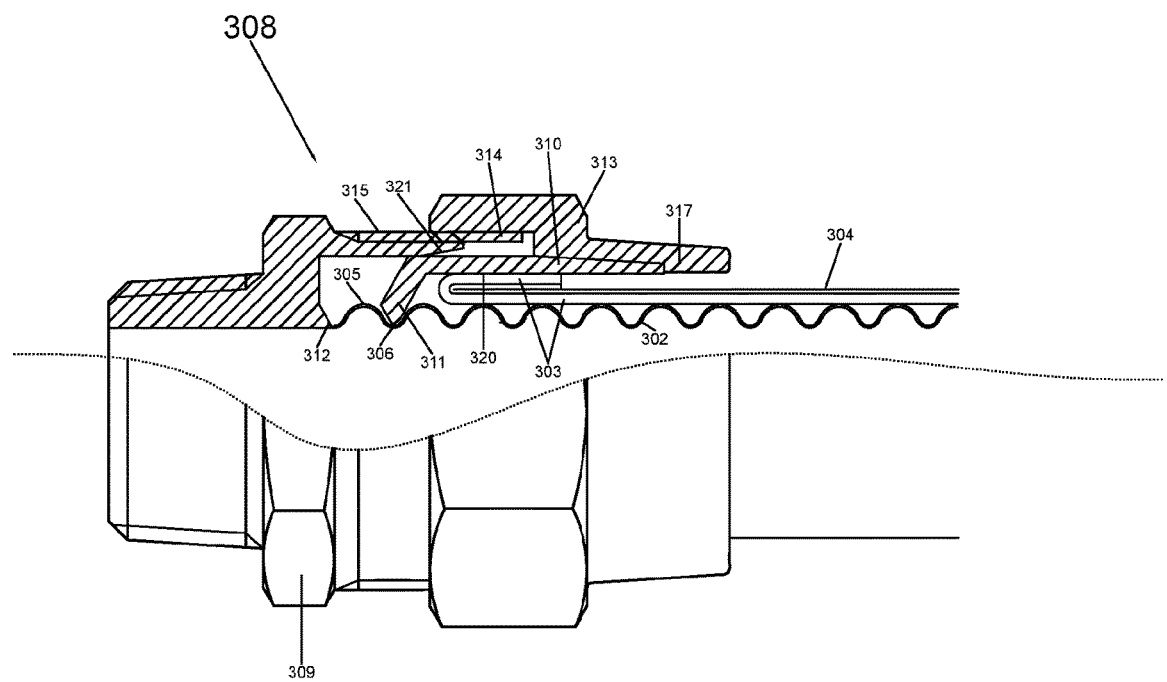
FIG. 6B shows a partially cross-sectional side view of the connector assembly of FIG. 6A in a partially assembled state.
Figure 6C:
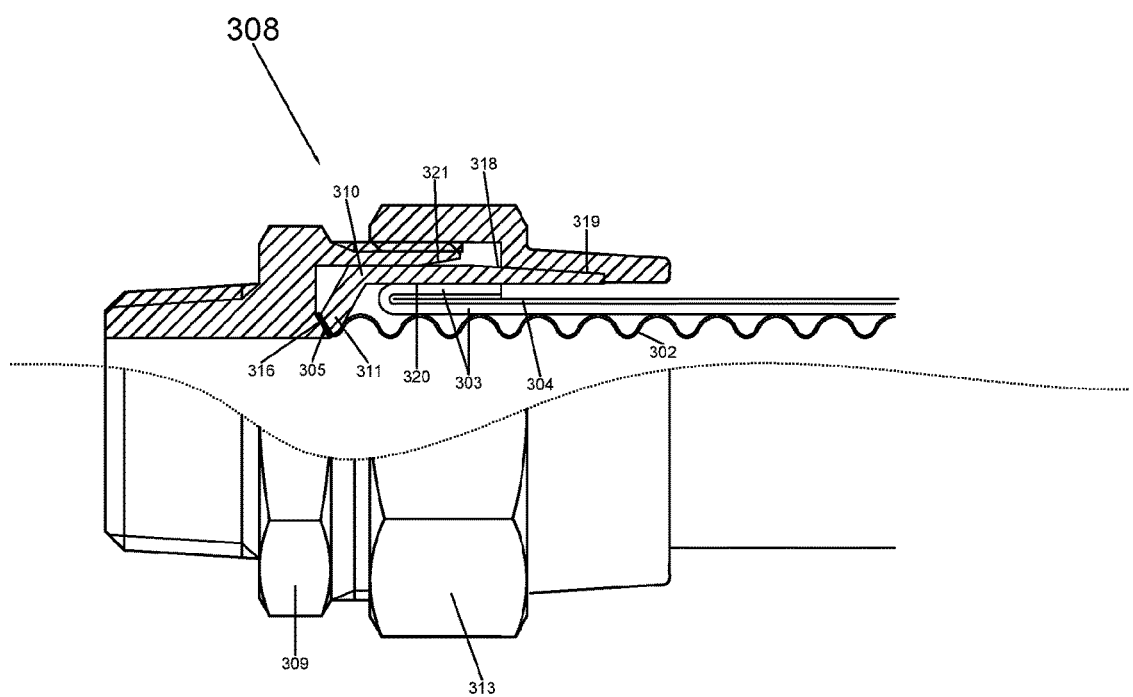
FIG. 6C shows a partially cross-sectional side view of the connector assembly of FIG. 6A in a fully assembled state.

A third embodiment of the invention shown in FIGS. 6A to 6C, in accordance with the third aspect of the present invention, show a connector assembly 308 in which the split retaining element or collet 310 is alignable and seatable both within the drivable nut or connector 313 and the fitting or fitting body 309. Advantageously, as a portion of the collet 310 is accommodated within the connector 313, specifically within the tail portion 317 of the connector 313, and the other portion of the collet 310 accommodated with the fluid passage of the fitting body 309 the collet 310 may be longer than in previous embodiments without significantly enlarging the overall size of the connector assembly 308. A longer collet 310 means that a larger portion of the metal braid layer 303 can be contained by the split retaining means collet 310, and therefore the installer can be less precise about at what point to fold back the flexible sheath layer 303. Additionally, a larger sheath contact portion 320 is available for use between the collet 310 and the metal braid layer 303, providing a more reliable electrical contact. In use, the connector assembly shown is a Male fitting and has one connection for attaching a length of corrugated tubing and a male thread for engagement with a female thread of some other fitting or appliance. It is understood that many other combinations could also be made, such as female, tee, reducing union etc.

The connector assembly 308 comprises a fitting or fitting body 309, a split retaining means element or collet 310, which here further comprises at least one retaining finger or radially inward protruding clamping element 311 which protrudes into the last valley or trough 306 on a cut length of corrugated tubing 302. The clamping element 311 is preferably an in-turned edge of the collet 310. The fitting includes a fluid-flow passage. The collet 310 is preferably a two-part split collet. The connector assembly 308 further includes a sealing face abutment surface or contact surface 312 and a drivable element nut or connector 313 which includes a first engagement element, here an interior female thread or threaded portion 314 which is engageable with a second engagement element, here an exterior male thread or threaded portion 315 radially extending around the outside of the fitting body 309. The collet 310 and connector 313 collectively provide axial loading means.

The collet 310 also preferably includes a sheath contact portion 320 for engaging the flexible sheath layer 303, which advantageously covers the length of a number of corrugation 305. The collet 310 is preferably slidably receivable within the fluid flow passage of the fitting 313 and additionally within the tail portion 317 of the connector 313

The clamping element 311 is preferably profiled for engaging a trough of the corrugated element 302.

FIG. 6A depicts the components of the connector assembly being prepared for the attachment of the connector assembly 308 to the reinforced corrugated tubing 301. Firstly, the reinforced corrugated tubing 301 is cut using a metal wheel pipe cutter. The connector 313 is then put onto the reinforced tubing 301 before the flexible sheath layer 303 and plastic cover 304 are folded back on itself so as to expose a number of corrugations 305. At this point in the installation process the flexible sheath layer 303 will be frayed and messy. The split collet 310 is then assembled so that its retaining finger 309 sits in the valley 306 of the last corrugation 305 of the corrugated tubing element 302, but also so that it encapsulates the frayed metal braid layer 303. Once the connector assembly 308 is fully installed, the frayed portion will no longer be visible giving a neat appearance.

The proximal end of the split retaining means collet 310 is then partially inserted into the fitting body 313 while at the same time the connector 312 is pulled over the distal end of the split collet 310.

Advantageously, the connector assembly 308 may include a number of features to aid in the attachment of the connector nut 313 to the fitting body 309, and to help the split retaining means collet 310 come together and clamp down on the metal braid layer 303 in the correct position, especially where the frayed flexible sheath layer 303 is preventing the split retaining means collet 310 from coming together and being inserted into the fitting body 309, and/or the placing of the connector over the distal end of the collet 310 is difficult.

The fitting body 309 includes a wider mouth 321 at its distal end allowing the split collet 310, which may not be properly aligned due the frayed metal braid layer 303, to more easily be inserted into the fitting body 309. As the connector 313 is driven onto the fitting body, the split collet 310 will be forced together inside the fitting body, due to the decreasing circumference of the interior wall of the fitting body 309, press down against the frayed metal braid layer 303, and ensure the correct alignment of the split retaining means collet 310.

Similarly, the beveled frusto conical surface 318 on the distal end of the collet 310 which matches a frusto conical shape 319 on the inside of the tail portion 317 of the connector 313 allows the connector to be pulled over the split collet 310 more easily, especially where the metal braid layer 303 is frayed and may be preventing the collet from coming together properly. As the connector 313 is further tightened onto the fitting body 309, the distal end of the split retaining means 310 will be forced together inside the connector 313, press down against the frayed metal braid 303 and ensure the correct alignment of the collet 310.

Advantageously, the above features ensure that the frayed flexible sheath layer 303 is firmly clamped between elements of the connector assembly 308 and the corrugated tubing element 302 ensuring both that the sheath layer cannot be pulled out, and that a strong electrical continuity between the connector assembly and the flexible sheath layer is achieved.

FIG. 6B depicts a partially assembled connector assembly 308. Initially, the retaining means collet 310 can be attached to the fitting body 309 by finger tightening, as the male 315 and female 314 threads will mate without resistance. As the connector 313 is further tightened onto the fitting body the un-deformed corrugated tubing element 302 will abut the flared abutment surface 312 of the fitting body 302 causing resistance to increase. At this point further tightening must be done by the use of a rotational tool, such as two wrenches or spanners which engages with the connector 313 and fitting body 309. As torque is applied to the connector nut and the fitting body, the last corrugation of the corrugated tubing element 302 will start to deform and flatten.

FIG. 6C depicts the connector assembly in its final assembled position, and where a seal has been obtained 316. The frayed metal braid layer is neatly held in a folded back position by the split collet 310, and electrical continuity exists between the metal braid layer 303 and the connector assembly 310. Advantageously a significant length of the metal braid layer is in contact with the sheath contact portion 320 of the collet 310, which advantageously covers a number of corrugations 305, significantly reducing the overall chance of galvanic corrosion breaking electrical continuity between the metal braid layer 303 and the connector assembly. Additionally the metal braid layer 303 is firmly clamped between the collet 310 and the corrugated tubing 302 ensuring that it cannot be easily pulled out.

Figure 7A:
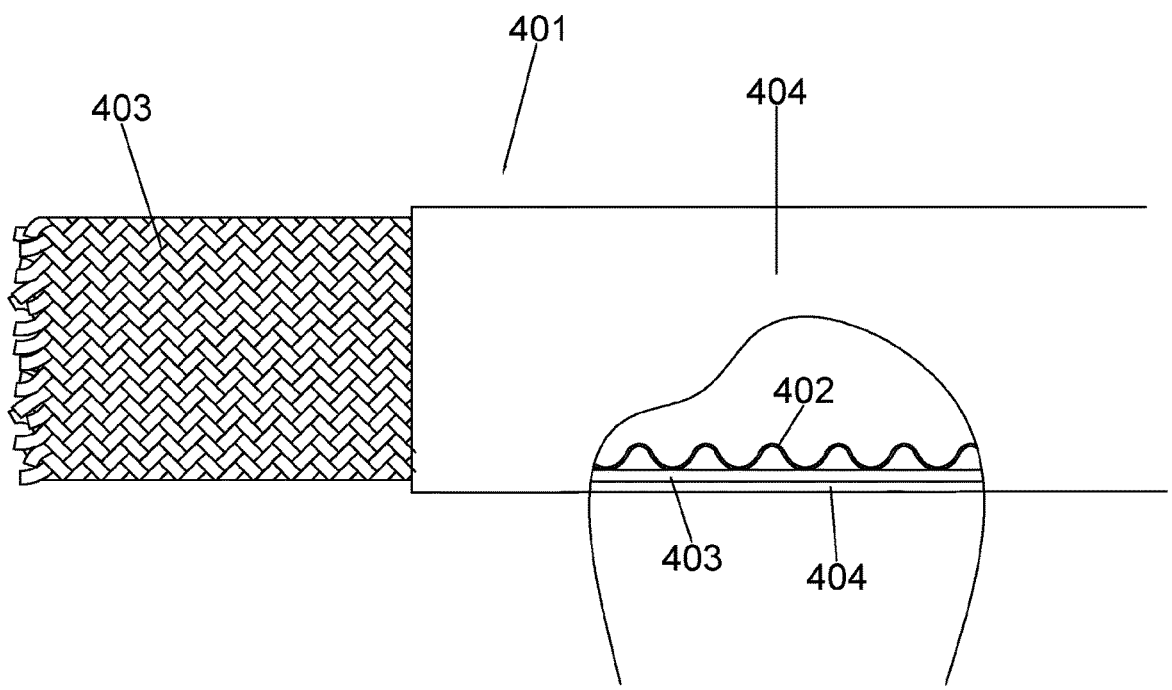
FIG. 7A shows a partially cross-sectional side view of the tubing of FIG. 1, from which a larger portion of the plastic cover has been removed.
Figure 7B:
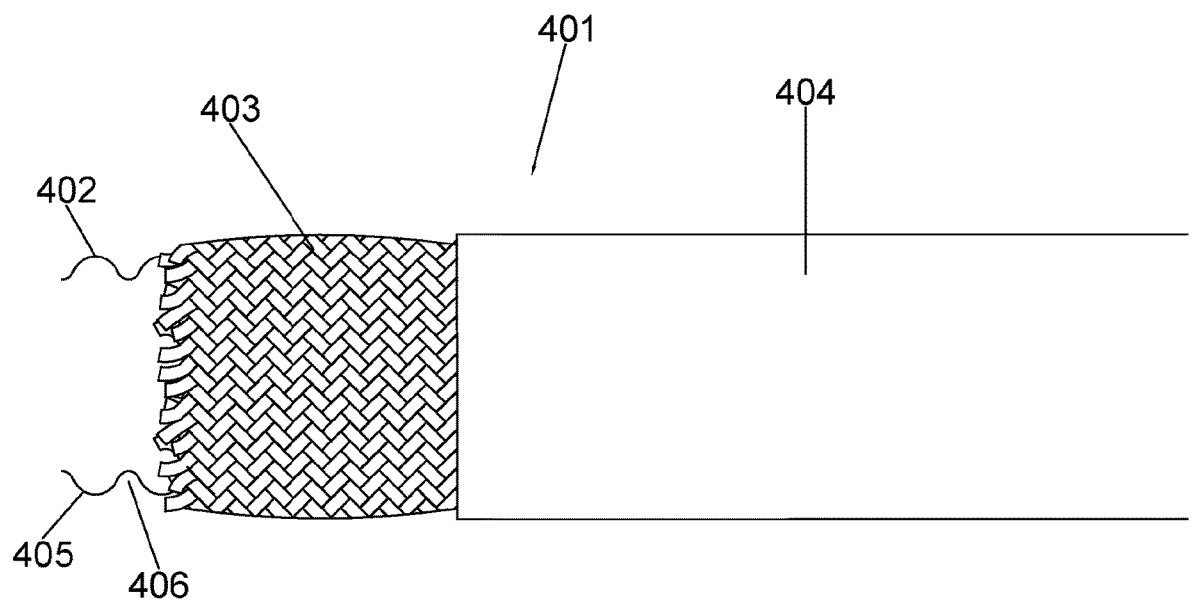
FIG. 7B shows a side view of the tubing of FIG. 1, in which the metal braided layer has been pushed back along an axial extent of the tubing.

The step of folding back the metal braid or flexible sheath layer need not be followed to expose enough corrugations for a connection to be made. As the metal braid can be manufactured so that it can be loosened around the corrugated tubing element, and additionally as the plastic cover can be manufactured so that it is loose around the flexible sheath layer, once enough of the plastic cover has been pulled back or folded back on itself, or if there is no plastic cover at all, the flexible sheath layer can be loosened and pulled back enough so as to expose a valley of a corrugation, or multiple corrugations. Alternatively, a length of the plastic cover may be removed by a utility knife so as to expose a number of corrugations. FIG. 7A depicts a length of reinforced corrugated tubing 401 with a large portion of the plastic cover 404 slidably pulled back. FIG. 7B depicts a length of reinforced corrugated tubing 401 with a section of the metal braid layer 403 loosened and pulled back such that a corrugation 405 and a corrugation valley or trough 406 are exposed and on which a connector assembly 408 can be assembled. The loosened flexible sheath 403 will take on a slightly floppy shape and larger diameter around the corrugated tubing 402 after it has been loosened and pulled back.

Figure 8A:
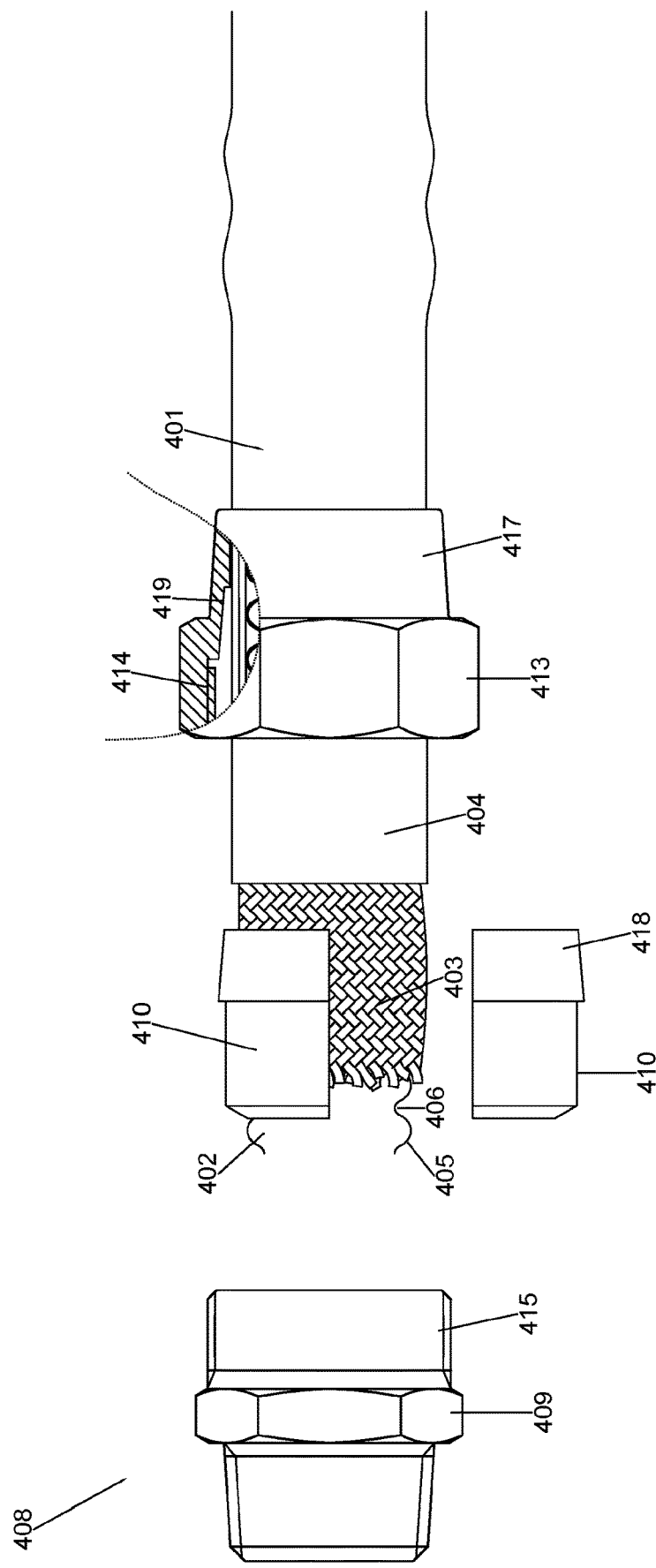
FIG. 8A shows a partially cross-sectional side view of a fourth embodiment of a connector assembly in a disassembled state around the tubing of FIG. 1, in accordance with a fourth aspect to tenth aspects.
Figure 8B:
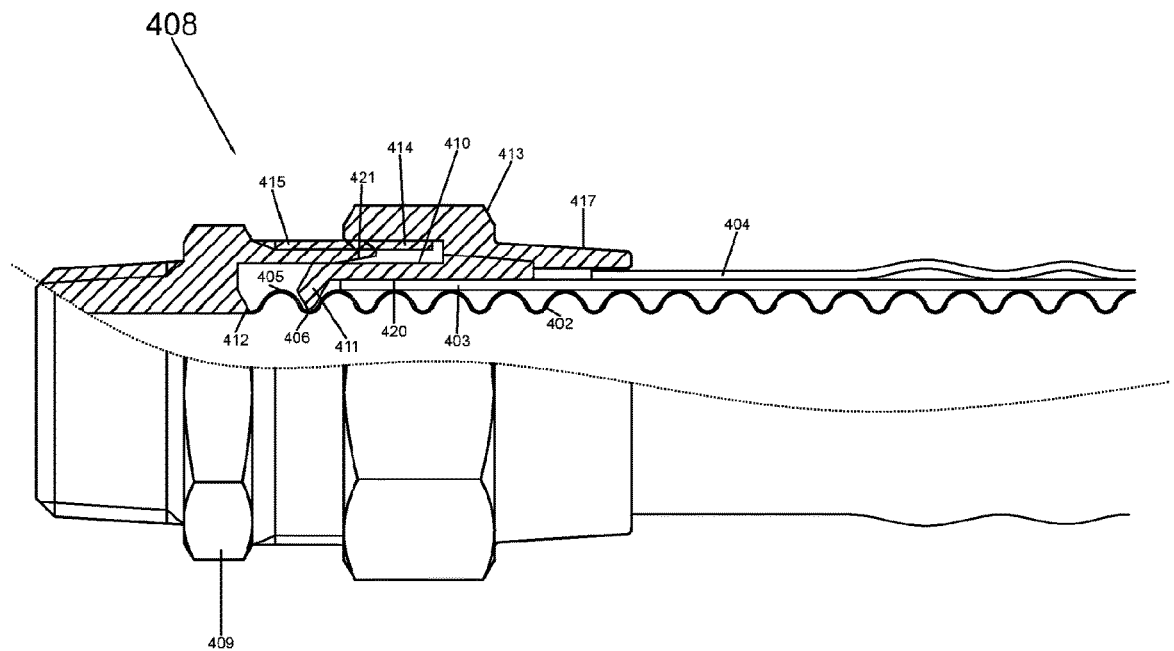
FIG. 8B shows a partially cross-sectional side view of the connector assembly of FIG. 8A in a partially assembled state.
Figure 8C:
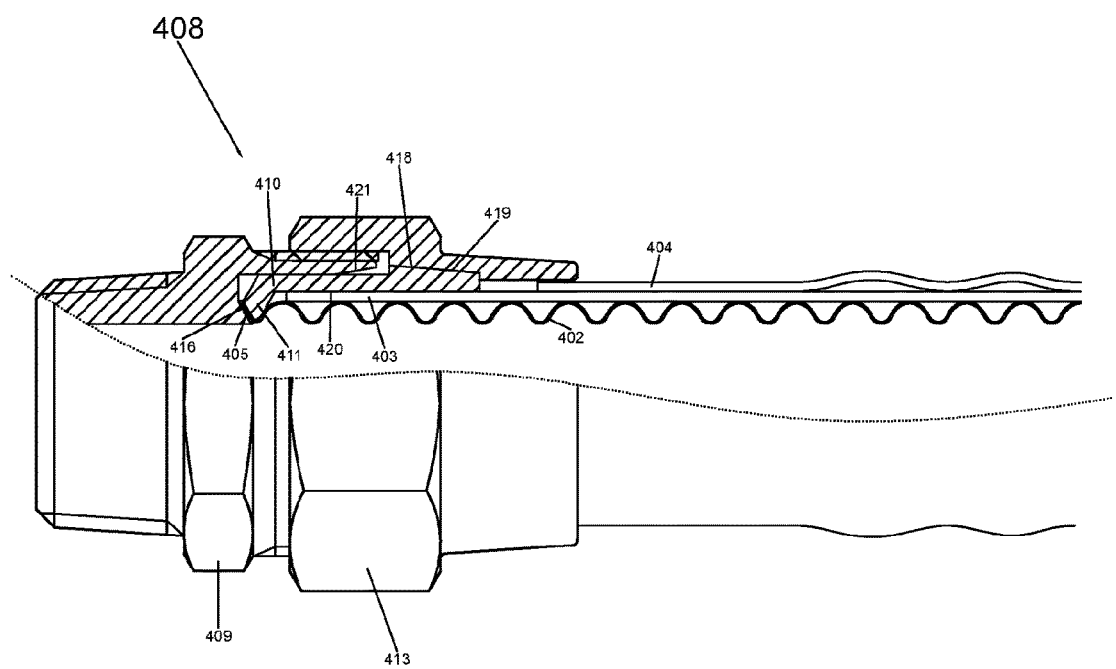
FIG. 8C shows a partially cross-sectional side view of the connector assembly of FIG. 8A in a fully assembled state.

A fourth embodiment of the invention shown in FIGS. 8A to 8C, not in accordance with the present invention, shows a connector assembly 408 in which the split retaining element collet 410 is alignable and seatable both within the drivable nut or connector 413 and the fitting body 409, and in which the flexible sheath layer 403 is not folded over on itself but simply pulled back to expose a corrugation 405 and corrugation valley 406 on which an assembly can be made. A in use the connector assembly shown is a Male fitting and has one connection for attaching a length of corrugated tubing and a male thread for engagement with a female thread of some other fitting or appliance. It is understood that many other combinations could also be made, such as female, tee, reducing union etc.

The connector assembly 408 comprises a fitting or fitting body 409, a split retaining means element or collet 410, which here further comprises at least one retaining finger or radially inward protruding clamping element 411 which protrudes into the last valley or trough 406 on a cut length of corrugated tubing 402. The clamping element 411 is preferably an in-turned edge of the collet 410. The fitting includes a fluid-flow passage. The collet 410 is preferably a two-part split collet. The connector assembly 408 further includes a sealing face abutment surface or contact surface 412 and a drivable element nut or connector 413 which includes a first engagement element, here an interior female thread or threaded portion 414 which is engageable with a second engagement element, here an exterior male thread or threaded portion 415 radially extending around the outside of the fitting body 409. The collet 410 also preferably includes a sheath contact portion 420 for engaging the outer sheath layer, which advantageously is long enough such that it covers a number of corrugations 405. The clamping element 411 is preferably profiled for engaging a trough of the corrugated element 402.

FIG. 8A depicts the components of the connector assembly being prepared for the attachment of the connector assembly 408 to the reinforced corrugated tubing 401. Firstly, the reinforced corrugated tubing 401 is cut using a metal wheel pipe cutter. The connector 413 is then put onto the reinforced tubing 401 before part of the plastic cover 404 is pulled back so as to expose a length of the flexible sheath layer 403. A sufficient length of the plastic cover 404 must be pulled back or folded over on itself, such that enough of the flexible sheath layer 403 is exposed for it to be loosened and pulled back sufficiently so as to expose at least one corrugation valley 406. At this point in the installation process the flexible sheath layer 303 will be frayed and messy, and around the outside circumference will be bowed instead of tight around the corrugated tubing element 402. The split collet 410 is then assembled so that its retaining finger 411 sits in the trough of the last corrugation 406 of the corrugated tubing element 402, but also so that it encapsulates the frayed flexible sheath layer 403. Once the connector assembly 408 is fully installed, the frayed portion will no longer be visible giving a neat appearance.

The proximal end of the collet 410 is then partially inserted into the fitting body 409 while at the same time the connector 413 is pulled over the distal end of the collet 410.

Advantageously, the connector assembly 408 may include a number of features to aid in the attachment of the connector 413 to the fitting body 409, and to help the split retaining means collet 410 come together in the correct position and clamp down on the flexible sheath layer 403, especially where the frayed or bowed metal braid is preventing the split retaining means collet 410 from coming together and being inserted into the fitting body, and/or the placing of the connector 413 over the distal end of the collet 410.

The fitting body 409 includes a wider mouth 421 at its distal end allowing the split collet 410, which may not be properly aligned due the metal braid layer 403, to more easily be inserted into the fitting body 409. As the connector 413 is driven onto the fitting body, the split retaining means collet 410 will be forced together by the decreasing circumference of the interior wall of the fitting body 409, press down against the frayed metal braid layer 403, and ensure the correct alignment of the split collet 410.

Similarly, the beveled frusto conical surface 418 which matches a frusto conical shape 419 on the inside of the tail portion 417 of the connector 413 allows the connector to be pulled over the split retaining means collet 410 more easily, especially where the flexible sheath layer 403 is especially frayed or bowed and may be preventing the collet 410 from coming together properly. As the connector 413 is further tightened onto the fitting body 409, the split retaining means collet 410 will be forced together inside the connector 413, press down against the frayed flexible sheath layer and ensure the correct alignment of the split retaining means collet 413.

Advantageously, the above features ensure that the frayed flexible sheath layer 403 is firmly clamped between elements of the connector assembly 408 and the corrugated tubing element 402 ensuring both that the braid 403 cannot be pulled out, and that a strong electrical continuity between the connector assembly and the metal braid layer 403 is achieved.

FIG. 8B depicts a partially assembled retaining connector assembly 408. Initially, the connector 413 can be attached to the fitting body by finger tightening, as the male 415 and female 414 threads will mate without resistance. As the connector 413 is further tightened onto the fitting body 409 the un-deformed corrugated tubing element 402 will abut the flared abutment surface 412 of the fitting body 409 causing resistance to increase. At this point further tightening must be done by the use of a rotational tool, such as two wrenches or spanners, which engages with the connector 413 and fitting body 409. As torque is applied to the connector and the fitting body, the last corrugation 405 of the corrugated tubing element 402 will start to deform and flatten.

Figure 9:
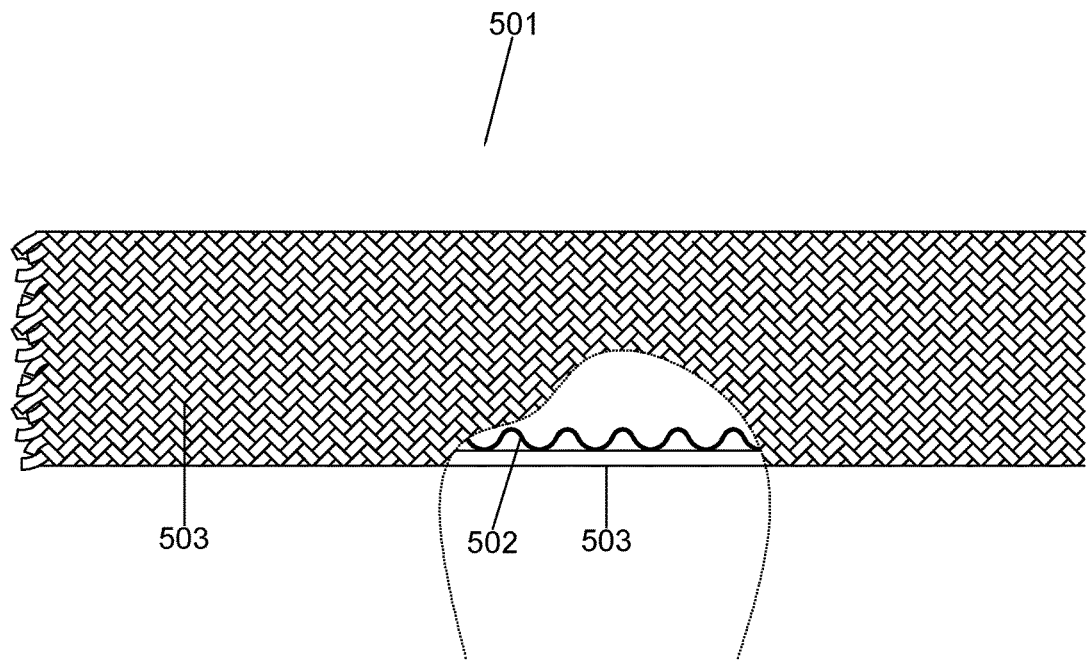
FIG. 9 shows a partially cross-sectional side view of a prior art reinforced corrugated stainless-steel tubing having a metallic braided layer and no plastic cover.
Figure 10:
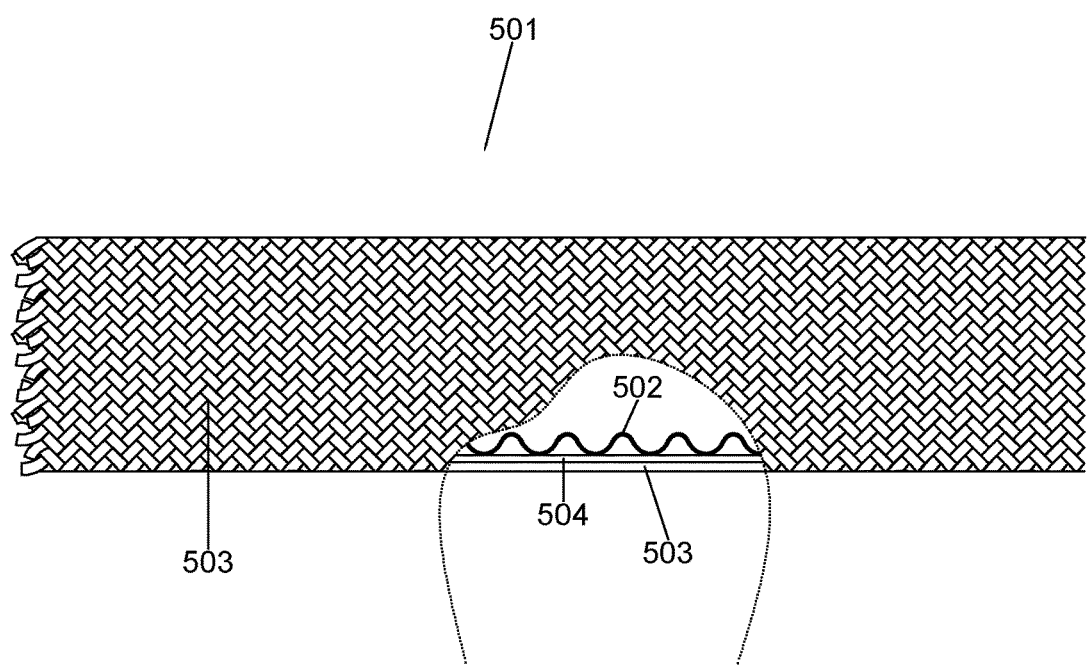
FIG. 10 shows a partially cross-sectional side view of a prior art reinforced corrugated stainless-steel tubing having a metallic braided layer and an internal plastic layer.
Figure 11:
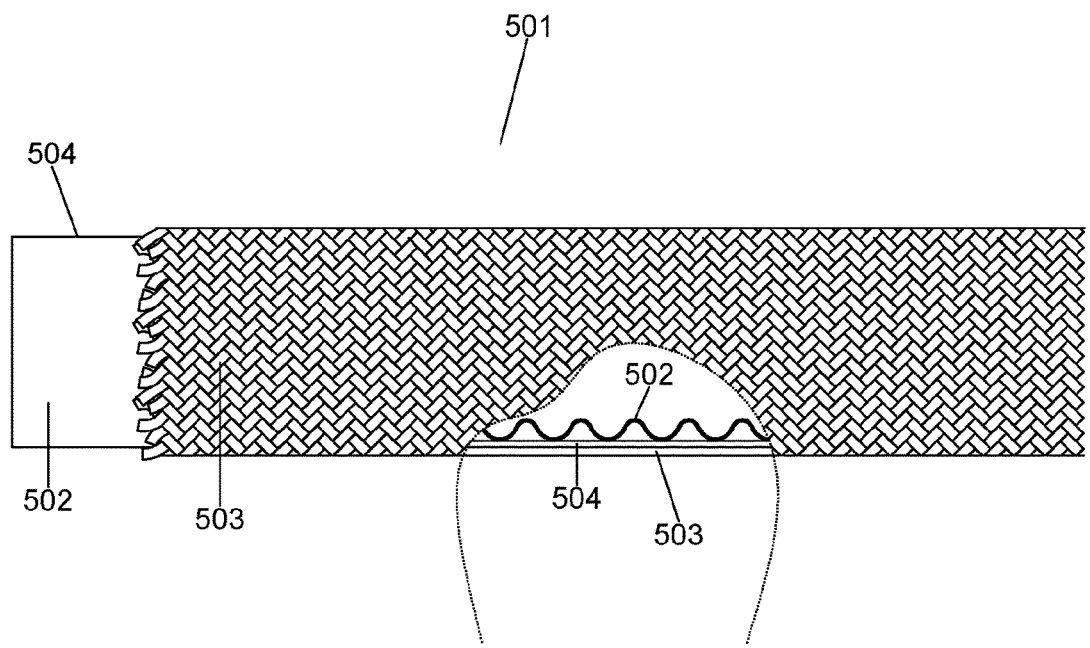
FIG. 11 shows a partially cross-sectional side view of the tubing of FIG. 9, in which the metal braided layer has been pulled back to expose the internal plastic layer.
Figure 12:
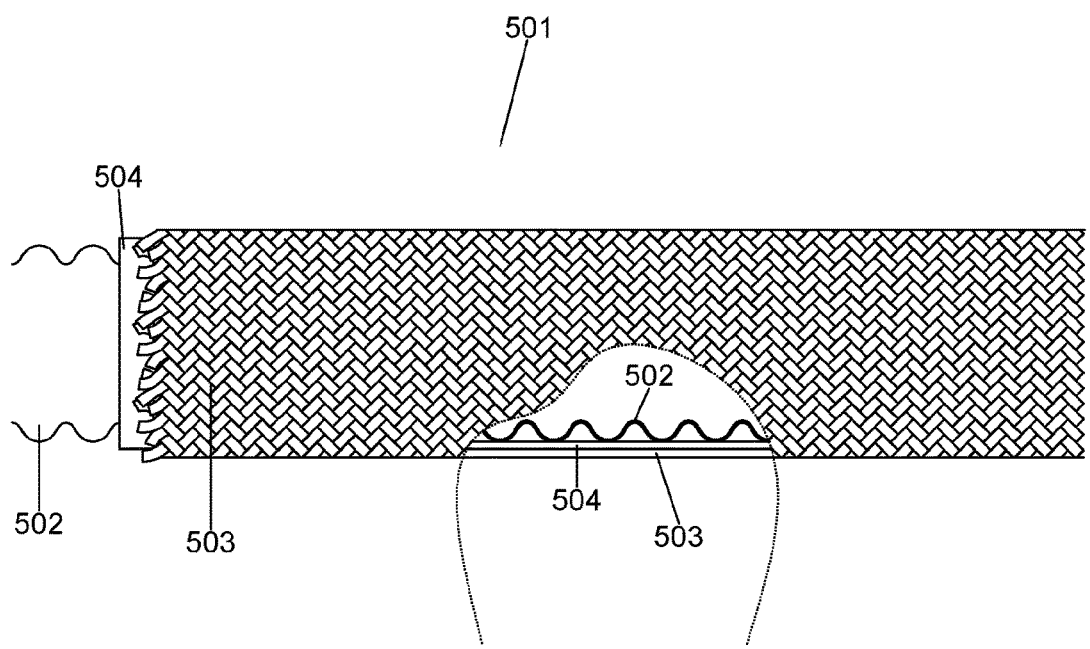
FIG. 12 shows a partially cross-sectional side view of the tubing of FIG. 9, in which the internal plastic layer has been partially removed.

FIG. 8C depicts the connector assembly 408 in its final assembled position, and where a seal 416 has been obtained. The frayed metal braid layer 403 is neatly held in position by the collet 410, and electrical continuity exists between the metal braid layer 403 and the connector assembly 410. Advantageously a significant length of the metal braid is in contact with the connector assembly and advantageously this sheath contact portion 420 covers multiple corrugations significantly reducing the overall chance of galvanic corrosion breaking electrical continuity between the metal braid and the connector assembly. Additionally the metal braid layer 403 is firmly clamped between the split retaining means collet 410 and the corrugated tubing element 402 ensuring that it cannot be easily pulled out The conductive metal braid or reinforcing flexible sheath layer need not include an exterior plastic cover or protective sheath layer, or instead may include a plastic cover adjacent to the corrugated tubing element, such that the metal braid or flexible sheath layer runs along the outside of the reinforced tubing along its entire length. FIG. 9 depicts a length of reinforced corrugated tubing 501 with an outer metal braid or flexible sheath layer 503, but no plastic layer. FIG. 10 depicts a length of reinforced corrugated tube 501 with a plastic polymer layer 504 adjacent to the corrugated tubing element 502 and with an exterior metal braid or flexible sheath layer 503. In both figures, the tubing has been cut, and therefore the flexible sheath layer 503 on the outside has become damaged and frayed. As the flexible sheath layer 503 can be manufactured so that it can be loosened around the corrugated tubing element, the braid can be pulled back or folded over if required. FIG. 11 shows a length of reinforced tubing 501 with the metal braid layer 503 slightly loosened so as to expose a small length of corrugated tubing 502, which in this case includes a plastic layer 504. FIG. 13 depicts the reinforced corrugated tubing of FIG. 13, but with a small section of the plastic layer 504 having been removed by a utility knife.

A fifth embodiment of the invention shown in FIGS. 13A to 13D, show a connector assembly 508 in which the collet 510 is alignable and seatable both within the connector 513 and the fitting body 509, and in which the flexible sheath layer 503 is located around the exterior of the reinforced corrugated tubing 501, which may or may not include a plastic layer 504 in-between the corrugated tubing element 502 and the flexible sheath layer 503. In use the connector assembly shown is a Male fitting and has one connection for attaching a length of corrugated tubing and a male thread for engagement with a female thread of some other fitting or appliance. It is understood that many other combinations could also be made, such as female, tee, reducing union etc.

The connector assembly 508 comprises a fitting or fitting body 509, a split retaining means element or collet 510, which here further comprises at least one retaining finger or radially inward protruding clamping element 511 which protrudes into the last valley 505 on a cut length of corrugated tubing 502. The connector assembly 508 further includes a sealing face abutment surface or contact surface 512 and a drivable element nut or connector 513 which includes a first engagement element, here an interior female thread or threaded portion 514 which is engageable with a second engagement element, here an exterior male thread or portion 515 radially extending around the outside of the fitting body 509.

Figure 13A:
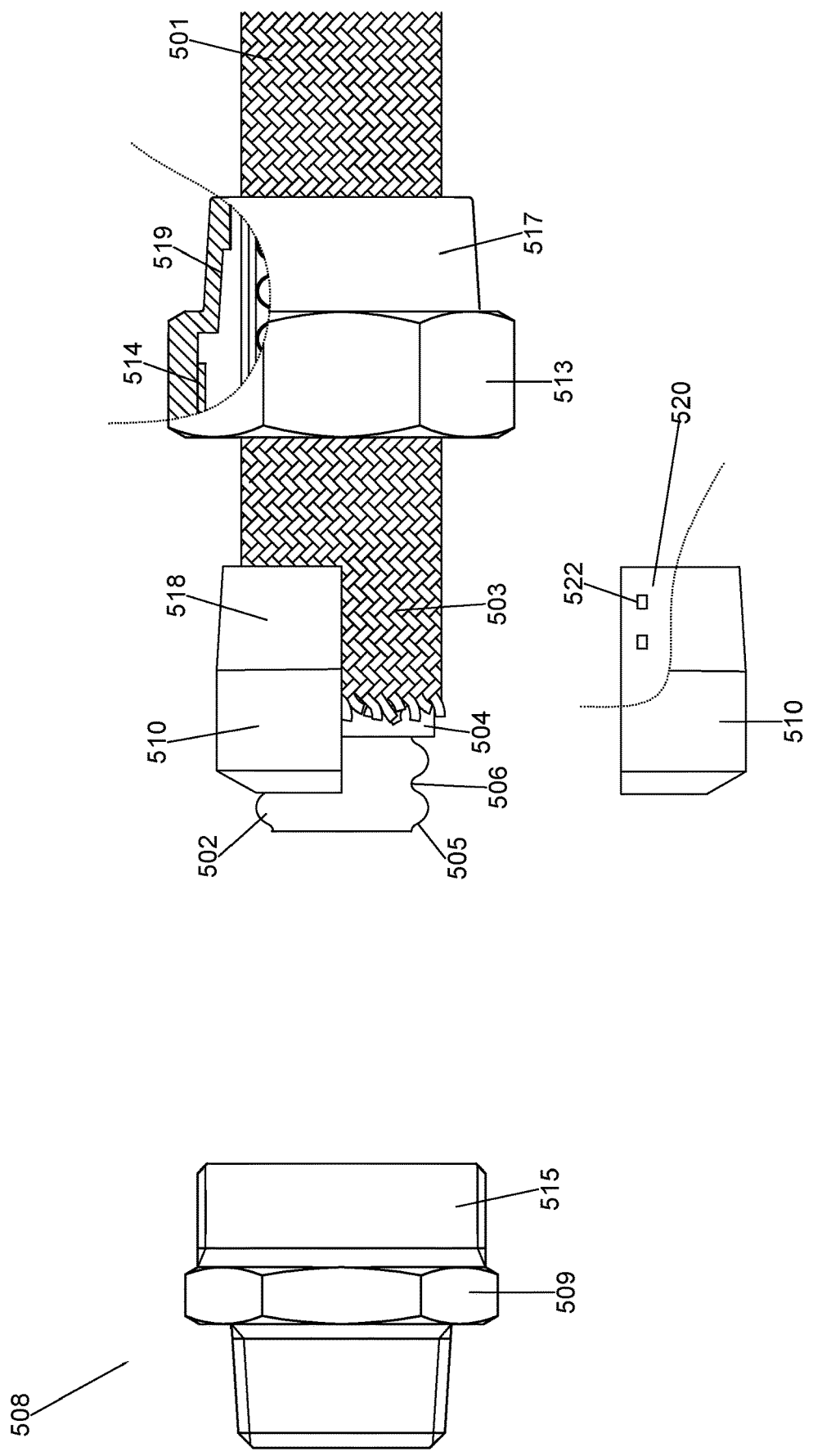
FIG. 13A shows a partially cross-sectional side view of a fifth embodiment of a connector assembly in a disassembled state around the tubing of FIG. 11, in accordance with the fourth aspect to tenth aspect.

FIG. 13A depicts the components of the connector assembly being prepared for the attachment of the connector assembly 508 to the reinforced corrugated tubing 501. Firstly, the reinforced corrugated tubing 501 is cut using a metal wheel pipe cutter. The connector 513 is then put onto the reinforced tubing 501 before the exterior flexible sheath layer 503 is slightly loosened and pulled back so as to expose a small length of corrugated tubing 502. If the corrugated tubing element 502 includes a plastic layer 504 in-between the flexible sheath layer 503 and the corrugated tubing 501, a small section of the plastic layer 504 is removed using a utility knife, cover stripping tool or by peeling off a small section by hand. At this point in the installation process the flexible sheath layer 503 will be frayed and messy, and around the outside circumference will be bowed instead of tight around the corrugated tubing element 502. The split collet 510 is then assembled so that its retaining finger 511 sits in the last corrugation 505 of the corrugated tubing element 502, but also so that it encapsulates the frayed flexible sheath layer 503.

Advantageously, the split collet 510 may include a series of piecing teeth 522 on its inner surface. The teeth may be distributed evenly around the circumference of the inner surface or the sheath contact portion 520 of the collet 510. The teeth provide internal gripping elements. At least two of the teeth are in an axially spaced apart relationship. As the connector assembly 508 is tightened, and the split retaining means 510 aligned into their correct positions, these teeth 522 grab the flexible sheath layer 503 and prevent it from being pulled out of the connector assembly 508 after installation.

The proximal end of the collet 510 is then partially inserted into the fitting body 508 while at the same time the connector 513 is pulled over the distal end of the split retaining means collet 510

Advantageously, the connector assembly 508 may include a number of features to aid in the attachment of the connector 513 to the fitting body 509, and to help the split collet 510 come together in the correct position, especially where the frayed or bowed metal braid layer is preventing the split collet 510 from coming together and being inserted into the fitting body 509, and/or the placing of the connector 513 over the distal end of the collet 510 is difficult.

The fitting body 509 includes a larger diameter mouth 521 at its distal end allowing the collet 510, which may not be properly aligned due the flexible sheath layer 503, to more easily be inserted into the fitting body 509. As the connector is driven onto the fitting body, the split retaining means collet 510 will be forced together inside the fitting body 509, press down against the frayed flexible sheath layer 503, and ensure the correct alignment of the split collet 510.

Similarly, the beveled frusto conical surface 518 of the distal end of the collet 510 which matches a frusto conical shape 519 on the inside of the tail portion 517 of the connector 513 allows the connector to be pulled over the distal end of the collet 510 more easily, especially where the braided flexible sheath layer 503 is frayed or bowed and may be preventing the split retaining means collet 510 from coming together properly. As the connector 513 is further tightened onto the fitting body, the split collet 510 will be forced together inside the connector 513, press down and clamp against the frayed flexible sheath layer 503 and ensure the correct alignment of the split retaining means collet 510.

Advantageously, the above features ensure that the frayed metal braid 503 is firmly clamped between elements of the connector assembly 508 and the corrugated tubing element 502 ensuring both that the braid cannot be pulled out, and that a strong electrical continuity between the connector assembly and the metal braid is achieved.

Figure 13B:
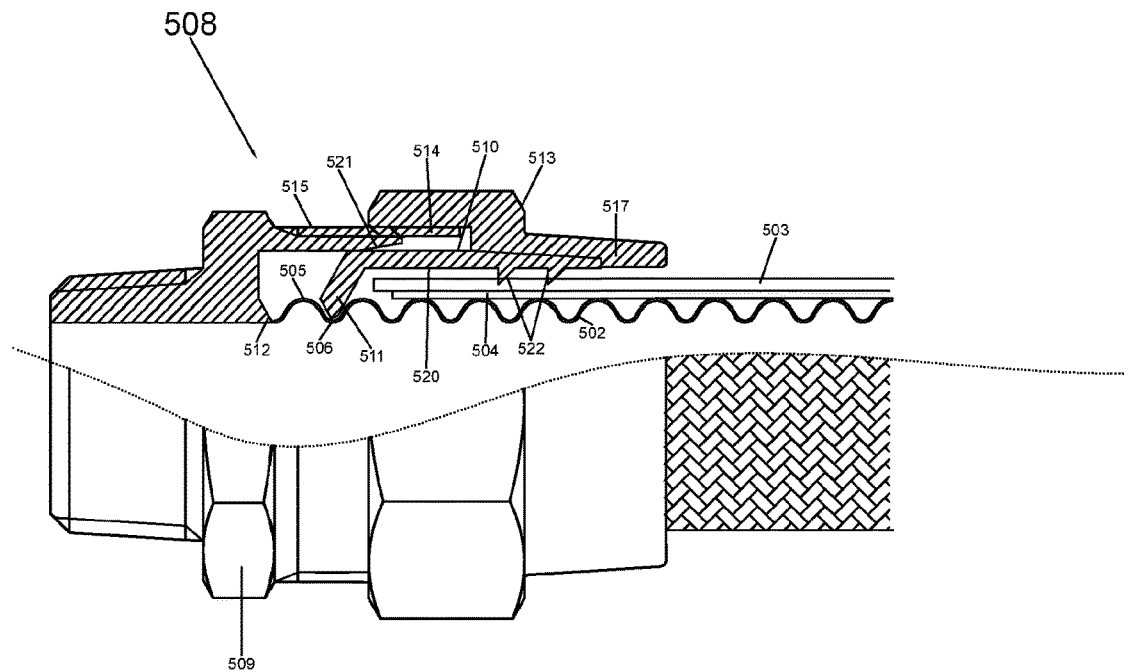
FIG. 13B shows a partially cross-sectional side view of the connector assembly of FIG. 13A in a partially assembled state.

FIG. 13B depicts a partially assembled connector assembly 508. Initially, the connector can be attached to the fitting body 509 by finger tightening, as the male 515 and female 514 threads will mate without resistance. As the connector 513 is further tightened onto the fitting body the un-deformed corrugated tubing element 502 will abut the flared abutment surface 512 of the fitting body 509 causing resistance to increase. At this point further tightening must be done by the use of a rotational tool, such as two wrenches or spanners, which engages with the connector 513 and fitting body 509. As torque is applied to the connector and the fitting body, the last corrugation 506 of the corrugated tubing element 502 will start to deform and flatten.

Figure 13C:
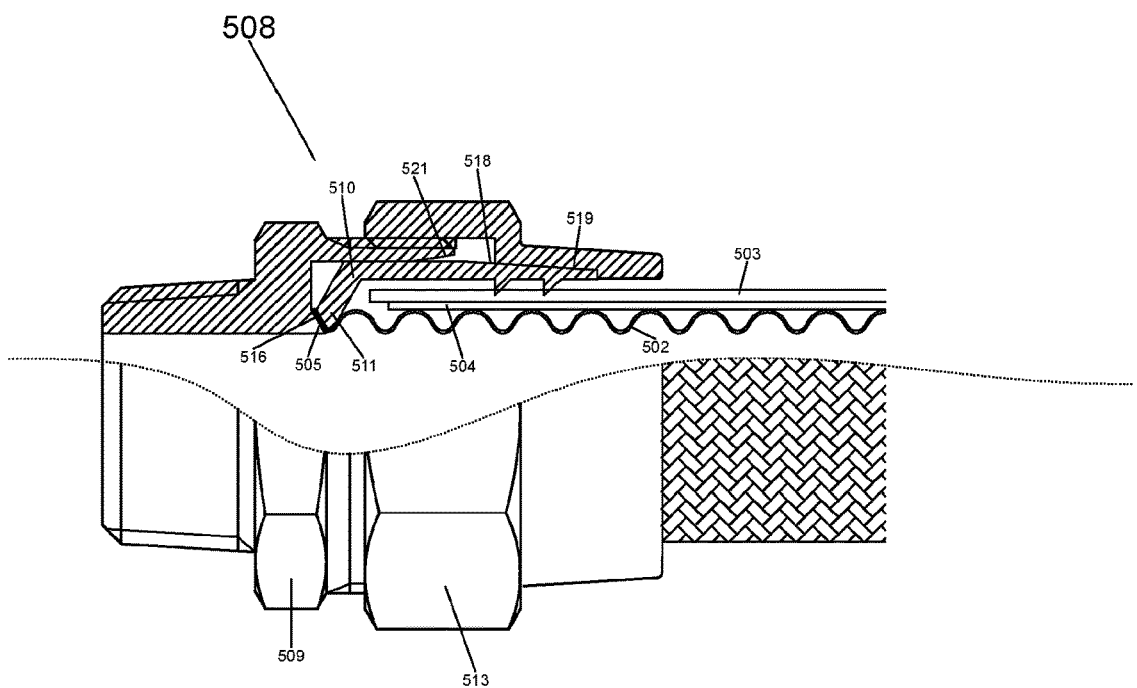
FIG. 13C shows a partially cross-sectional side view of the connector assembly of FIG. 13A in a fully assembled state.

FIG. 13C depicts the connector assembly 508 in its final assembled position, and where a seal 516 has been obtained. The frayed metal braid or flexible sheath layer 503 is neatly held in place by the split retaining means collet 510, and electrical continuity exists between the metal braid flexible sheath layer 503 and the connector assembly 508. Advantageously a significant length of the metal braid is in contact with the connector assembly, significantly reducing the overall chance of galvanic corrosion breaking electrical continuity between the metal braid and the connector assembly. Additionally the metal braid 503 is firmly clamped between the split retaining means collet 510 and the corrugated tubing element 502 ensuring that it cannot be easily pulled out.

Figure 13D:
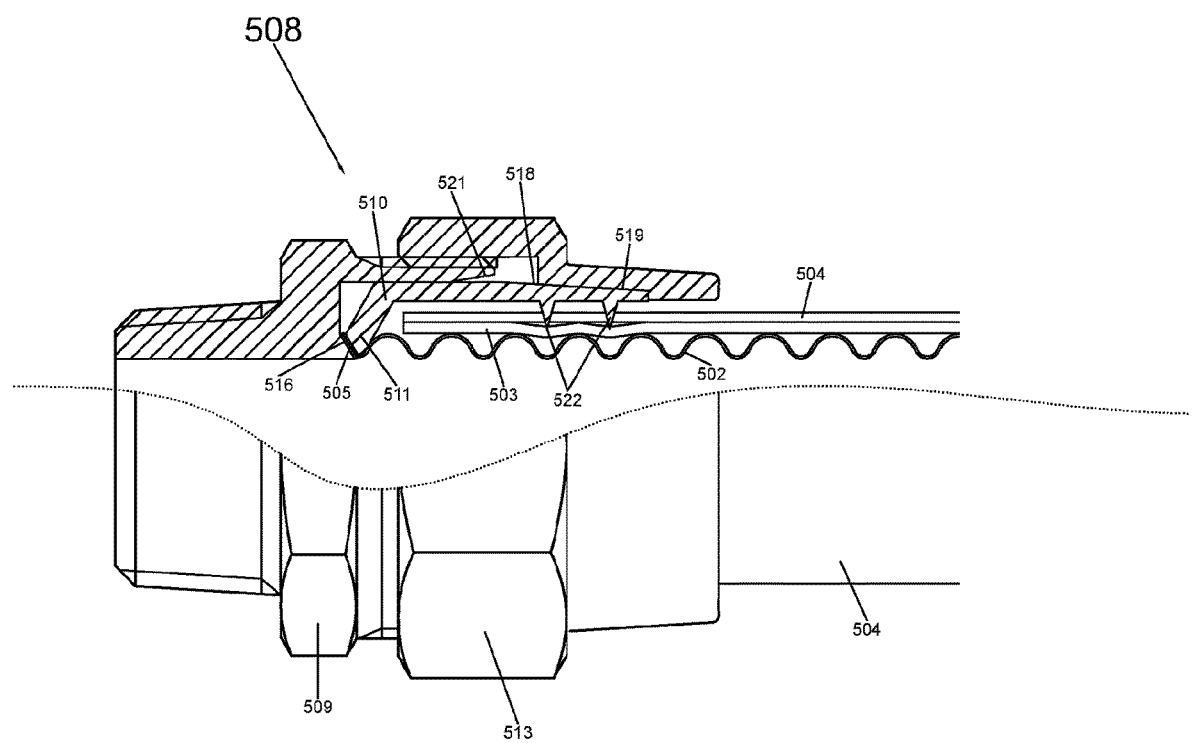
FIG. 13D shows a partially cross-sectional side view of the connector assembly of FIG. 13A in a fully assembled state.

The split retaining means collet 510 may optionally include a series of piercing teeth 522 which further aids in preventing pull out of the flexible sheath layer 503. Advantageously, the piecing teeth 522 may have a profile which is sufficiently sharp such that when the split collet 510 is clamped against the reinforced corrugated tubing 501, the piercing teeth are able to pierce through an exterior plastic cover 502 and make electrical contact with the metal braid layer 503 underneath. Optionally, this allows the reinforced tubing of FIG. 1 to be assembled to a connector assembly 508 without having to fold the flexible sheath layer 503 and plastic cover 504 back on itself, as depicted in FIG. 13D. FIG. 13D depicts a fully assembled connector assembly, where the piecing teeth 522 of the collet 510 have penetrated through the exterior plastic cover 504 to make electrical contact with the metal flexible sheath layer 503.

A sixth embodiment of the invention, in accordance with the first and second aspects of the present invention, in which the outer flexible sheath layer of the reinforced corrugated tubing of FIG. 1 need not be folded over on itself is depicted in FIG. 14A-14E. This embodiment includes a collet 610 a first part and a second part, the first part 630 being a corrugated-element engagement part having the radially inward protruding clamping element 611 and the second part 623 being a sheath-layer engagement part having the sheath-contact portion 625. The sheath-layer engagement part may preferably be a sheath-contact ring 623. The sheath-contact ring 623 is preferably made of metal, more preferably a stamped copper.

The sheath-layer engagement part 623 is preferably engageable with, and positionable radially inwardly of, the corrugated-element engagement part 630, in use. The sheath-layer engagement part 623 preferably includes a head portion 627 engagable with the corrugated-element engagement part 630 and/or a trough 606 of the inner corrugated element 602 therebetween so as to retain the sheath-layer engagement part 623 relative to the corrugated-element engagement part 630, in use. The head portion 627 preferably have retaining means at its proximal end for engaging with an inner surface of the radially inward protruding clamping element 611 and the trough 606 of the inner corrugated element 602 therebetween. The retaining means may include a plurality of angled teeth 628 that are circumferentially spaced apart.

The sheath-contact portion 625 may be provided distal of the head portion 627 and may be positionable between the inner corrugated element 602 and the sheath layer 603 of the reinforced corrugated tubing 601, in use. The sheath-contact portion 625 may have a tapered distal end or axially extending tail 626 to facilitate insertion of the sheath-contact portion 625 between the inner corrugated element 602 and the sheath layer 603 of the corrugated tubing. The sheath-contact portion 625 may have at least one axially extending tail.

The sheath-layer engagement part 623 may have a shoulder between the head portion and the sheath-contact portion for abutting an end of the sheath layer. The corrugated-element engagement part and the sheath-layer engagement part may be co-axially aligned, in use. Optionally the sheath layer engagement part or sheath contact ring 623 may include at least one angled tooth 629, which may be circumferentially spaced apart, which in use, upon insertion between the corrugated tubing element 602 and the flexible sheath layer 603 will prevent axial disassembly and prevent the flexible sheath layer 603 from being pulled away from the sheath contact ring 623 after assembly.

During assembly, the sheath contact ring 623 is inserted into the small gap 624 between the flexible sheath layer 603 and the corrugated tubing element 602. As the flexible sheath layer 603 can be manufactured in such a way that it is loose around the corrugated tubing element 602, the flexible sheath layer 603 and the outer plastic cover 604 are movable in relation to the corrugated tubing element 602. Therefore the sheath contact ring 623 can be inserted between the flexible sheath layer or metal braid 603 and the corrugated tubing element 602, and the flexible sheath layer 603 and plastic cover 604 will slightly expand to allow this insertion. Additionally, the sheath-contact ring 623 can be used as an aid to pull back a section of the flexible sheath layer 603 and the plastic cover 604 such that at least one corrugation 605 and one corrugation valley or trough 606 is exposed and on which a connector assembly can be assembled. Advantageously, the sheath contact ring 623 will be in electrical contact with the metal braid layer 603.

In use the connector assembly shown is a Male fitting and has one connection for attaching a length of corrugated tubing and a male thread for engagement with a female thread of some other fitting or appliance. It is understood that many other combinations could also be made, such as female, tee, reducing union etc.

The connector assembly 608 comprises a fitting or fitting body 609, a split retaining means element or collet 610, which here further comprises at least one retaining finger or radially inward protruding clamping element 611 which protrudes into the last valley or trough 606 on a cut length of corrugated tubing or the inner corrugated element 602. The clamping element 611 is preferably an in-turned edge of the collet 610. The fitting includes a fluid-flow passage. The connector assembly 608 further includes a sealing face abutment surface or contact surface 612 and a drivable element nut connector 613 which includes a first engagement element, here an interior female thread or threaded portion 614 which is engageable with a second engagement element, here an exterior male thread or threaded portion 615 radially extending around the outside of the fitting body 609. The collet 610 and connector 613 collectively provide axial loading means. The clamping element 611 is preferably profiled for engaging a trough of the corrugated element 602.

The collet 610 in this particular embodiment is formed by two parts, the first part of the collet comprises a corrugated-element engagement part 630 having the radially inward protruding clamping element 611 and the second part of the collet comprises a sheath-layer engagement part 623 having the sheath-contact portion 625. The sheath-layer engagement part is preferably a sheath-contact ring 623 which in use makes electrical contact with the flexible sheath layer 603.

The sheath contact ring 623 may include at least one (in FIG. 14A-14E two are depicted) tapered distal end or axially extending tail 626 which at its distal end forms a sharp lip to aid in insertion between the metal sheath layer 603 and the corrugated tubing element 602. The sheath contact ring also includes a head portion 627 which matches or closely matches the internal diameter of the corrugated-element engagement part 630 such that in use the sheath contact ring 623 is in electrical contact with the corrugated-element engagement part 630. In use there is a direct electrical pathway from the metal braid layer 603, to the sheath contact ring 623, to the corrugated-element engagement part 630 and to the fitting body 609. Optionally, the sheath contact ring 623 may include a number of angled teeth 628 on its head portion 627 which allow the sheath contact ring 623 to be clipped over the first corrugation 605 but which prevents movement of the sheath contact ring 623 in the proximal direction. This is advantageous as it prevents the flexible sheath layer 603 from pushing the sheath contact ring 623 out of position before the corrugated-element engagement part 630 of the collet 610 can be assembled.

Optionally, the corrugated-element engagement part 630 of the collet 610 includes a series of piercing teeth 622 which will grip the plastic cover 604 after assembly, and prevent the flexible sheath layer 603 and the plastic cover 604 from being pulled out after assembly.

Figure 14A:
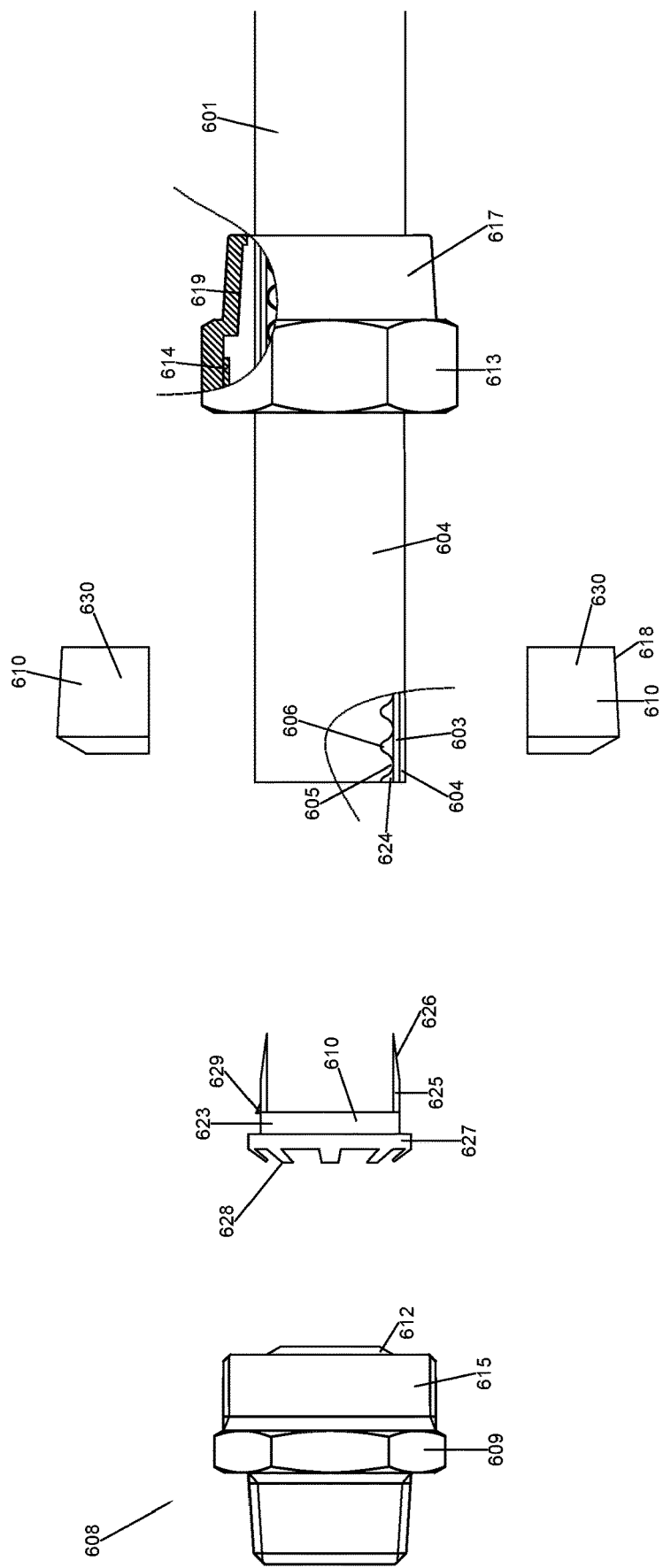
FIG. 14A shows a partially cross-sectional side view of a sixth embodiment of a connector assembly in a disassembled state around the tubing having a metallic braded layer and an outer plastic layer, in accordance with a first and second aspect of the present invention.

FIG. 14A depicts the components of the connector assembly being prepared for the attachment of the connector assembly 608 to the reinforced corrugated tubing 601. Firstly, the reinforced corrugated tubing 601 is cut using a metal wheel pipe cutter and the connector 613 is then put onto the reinforced tubing 601.

Figure 14B:
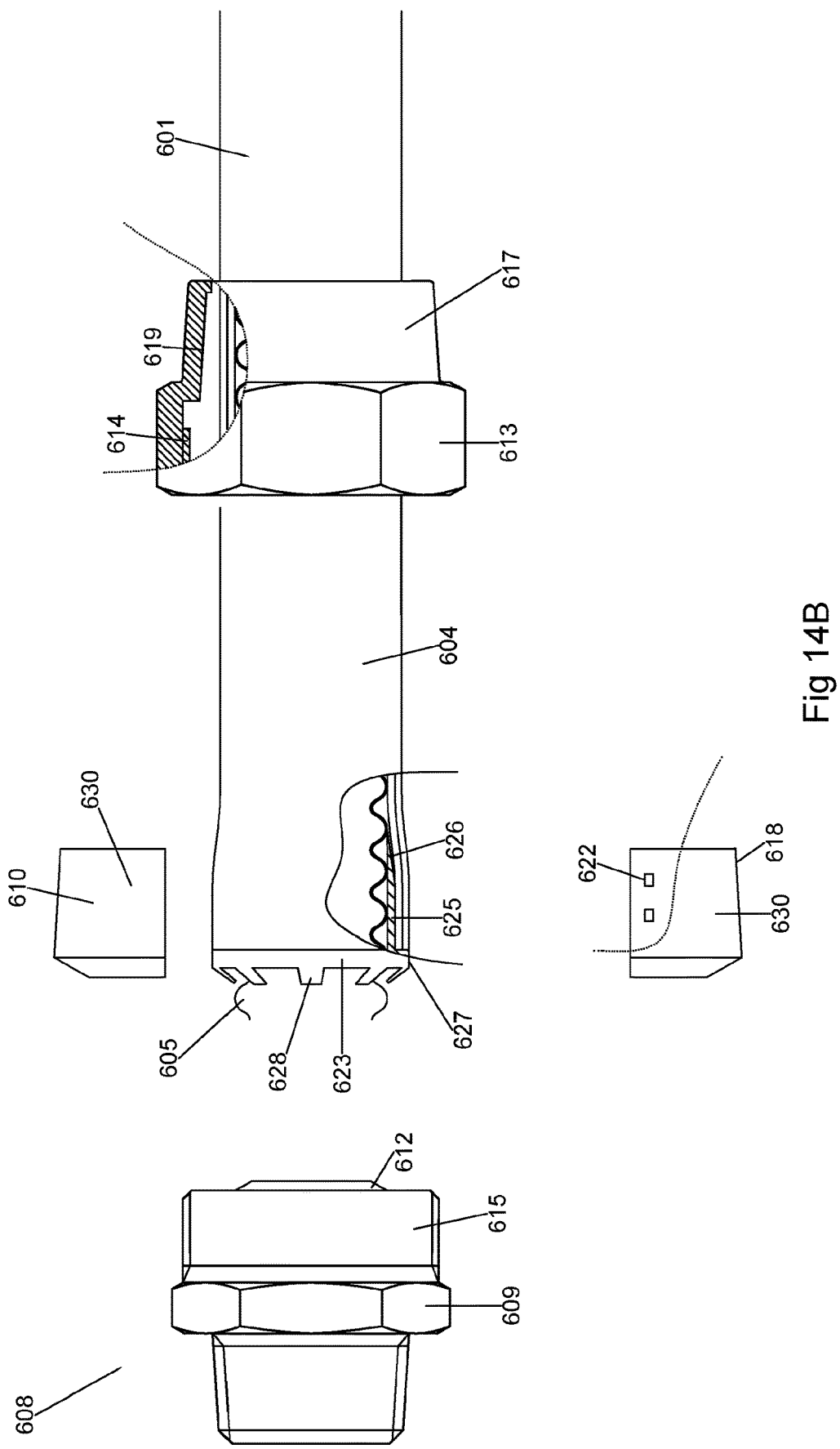
FIG. 14B shows a first partially cross-sectional side view of the connector assembly of FIG. 14A in a partially assembled state.

The sheath-contact ring 623 of the collet 610 is then inserted between the metal braid layer or flexible sheath layer 603 and the corrugated tubing element 602 as depicted in FIG. 14B. As the metal braid layer 603 and the plastic cover 604 are movable in relation to the corrugated tubing element 602, after the sheath-contact ring 623 is inserted additional force can be applied to it to pull back the metal braid layer 603 and the plastic cover 604 such that at least one corrugation 605 and one corrugation trough 606 are exposed. The tapered portion 626 of the sheath contact portion 625 allows easier insertion of the sheath-contact ring 623. When the sheath-contact ring 623 of the collet is clipped over the last corrugation 605, a series of angled teeth 628 prevent axial disassembly of the sheath-contact ring 623.

Figure 14C:
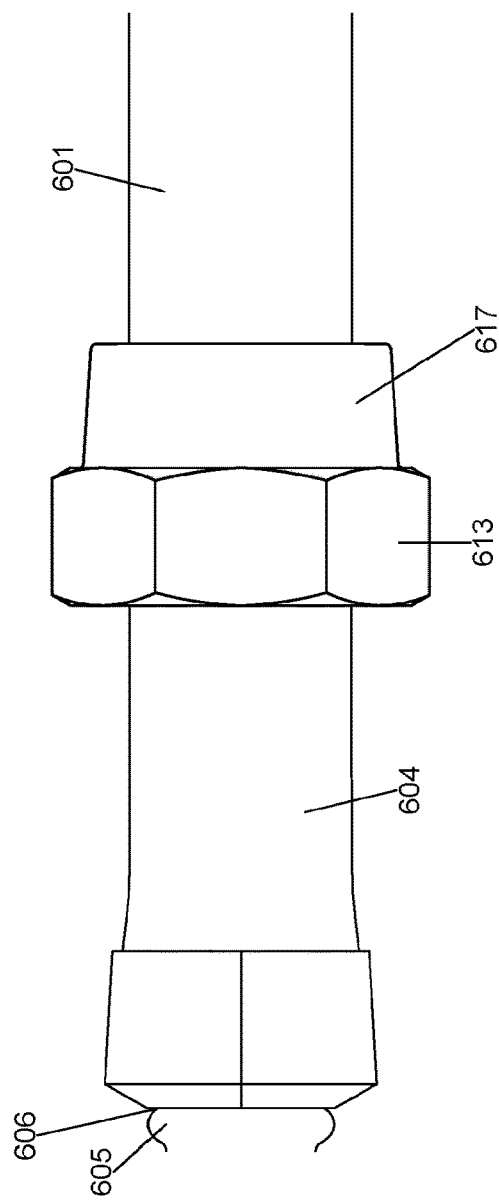
FIG. 14C shows a second partially cross-sectional side view of the connector assembly of FIG. 14A in a partially assembled state.
Figure 14C:
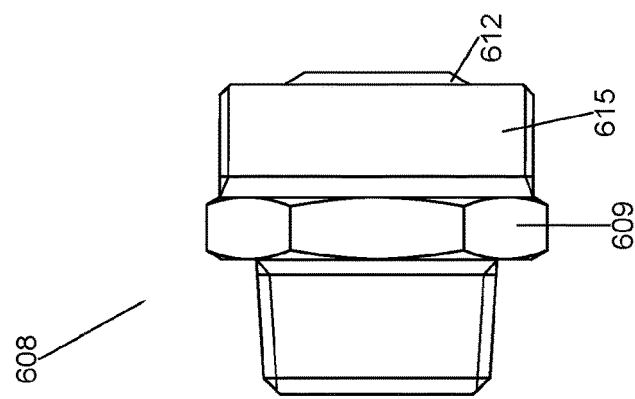

The corrugated-element engagement part 630 of the collet 610 are then assembled around the reinforced corrugated tubing 601 so that its retaining finger 611 sits in the last corrugation 606 of the corrugated tubing element as depicted in FIG. 14C and additionally is in electrical contact with a large portion of the sheath contact ring 623. The connector 613 is then pulled over the corrugated-element engagement part 630. Advantageously, the corrugated-element engagement part 610 includes a beveled frusto conical surface 618 which matches a frusto conical shape on the inside of the tail portion 617 of the connector 613. This feature allows the connector 613 to be pulled over the corrugated-element engagement part 630 more easily.

Figure 14D:
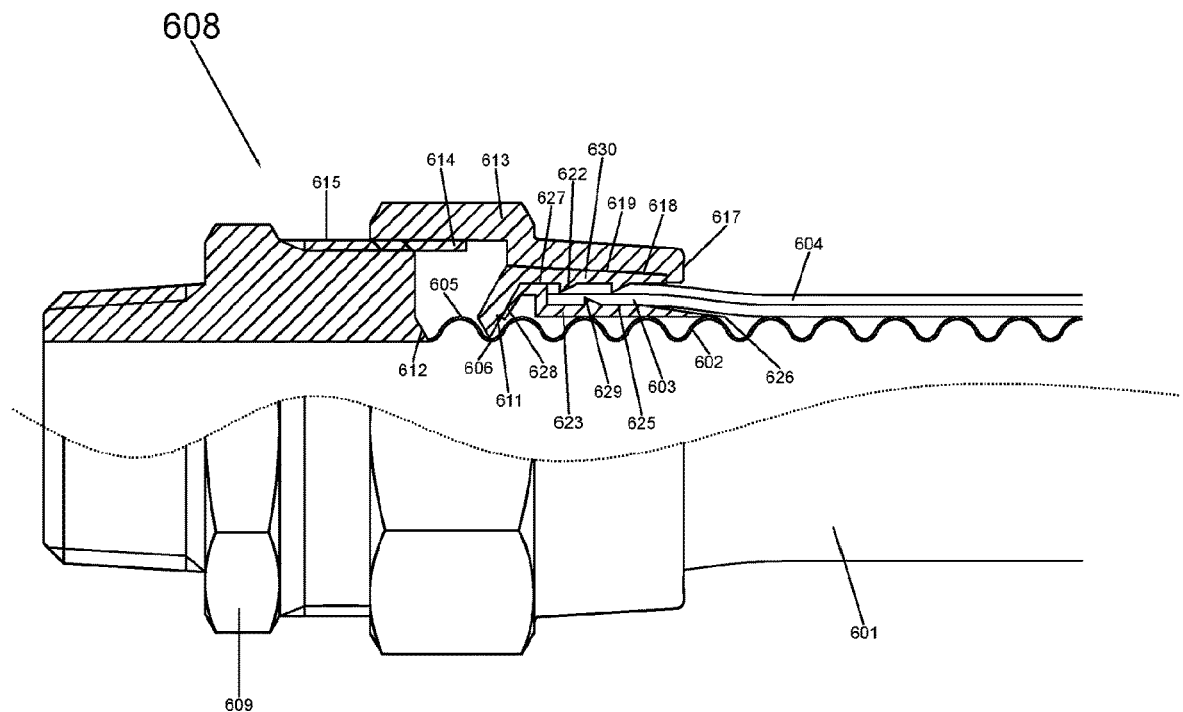
FIG. 14D shows a third partially cross-sectional side view of the connector assembly of FIG. 14A in a partially assembled state.

The completed collet 610, drivable nut connector 613 and reinforced corrugated tubing 601 are then partially attached to the fitting body 609 as depicted in FIG. 14D. Initially, the connector 613 can be attached to the fitting body by finger tightening, as the male 615 and female 614 threads will mate without resistance. As the connector 613 is further tightened onto the fitting body the un-deformed corrugated tubing 602 will abut the flared abutment surface 612 of the fitting body 609 causing resistance to increase. At this point further tightening must be done by the use of a rotational tool, such as two wrenches or spanners which engages with the connector 613 and fitting body 609. As torque is applied to the connector and the fitting body, the last corrugation 606 of the inner corrugated element 602 will start to deform and flatten.

Figure 14E:
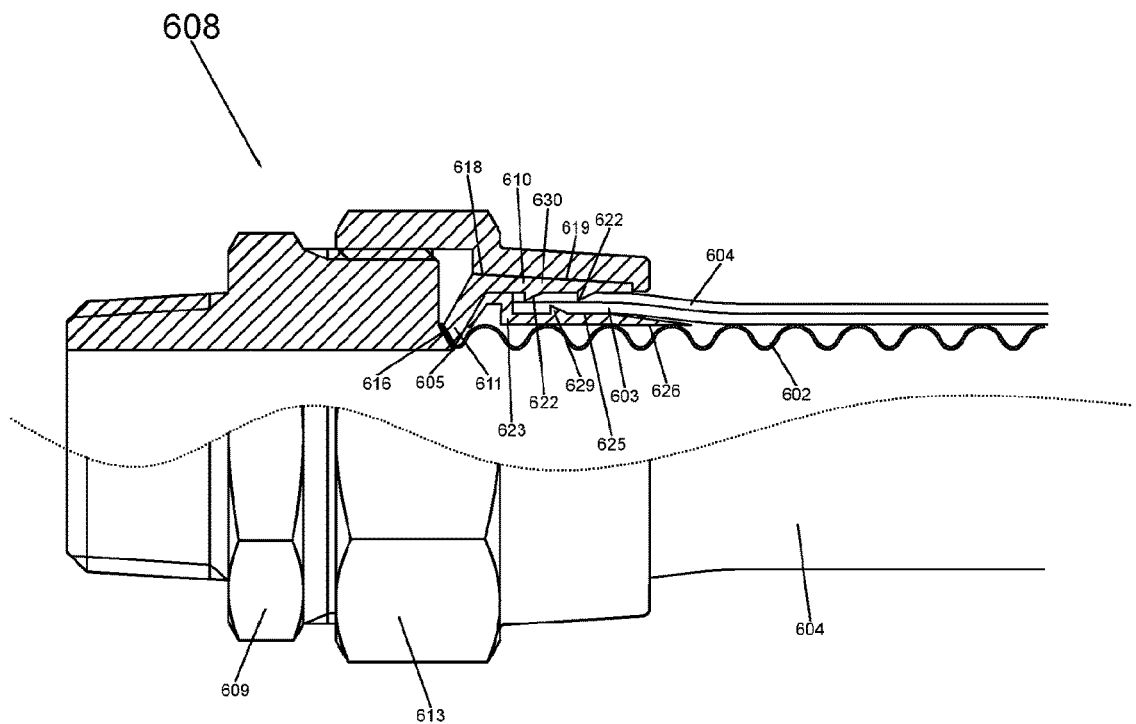
FIG. 14E shows a partially cross-sectional side view of the connector assembly of FIG. 14A in a fully assembled state.

FIG. 14E depicts the connector assembly in its final assembled position, and where a seal 616 has been obtained. The flexible sheath layer 603 has electrical continuity with the sheath-contact ring 623 and therefore the connector assembly 608. Additionally the flexible sheath layer 603 and plastic cover 604 are firmly clamped between the corrugated-element engagement part 630 of the collet, the inner corrugated element 602 and the sheath contact portion 625 of sheath-contact ring 623 ensuring that the flexible sheath layer 603 cannot easily be pulled out.

Optionally, the corrugated-element engagement part 630 includes a number of piercing angled teeth 622 which grip the plastic cover 604 further preventing axial pullout of the plastic cover 604 or the flexible sheath layer 603.

Optionally, the sheath contact ring 623 includes a number of piercing angled teeth 629, which grip the flexible sheath layer 603 further preventing axial pullout of the flexible sheath layer 603 and the plastic cover 604.

Figure 14F:
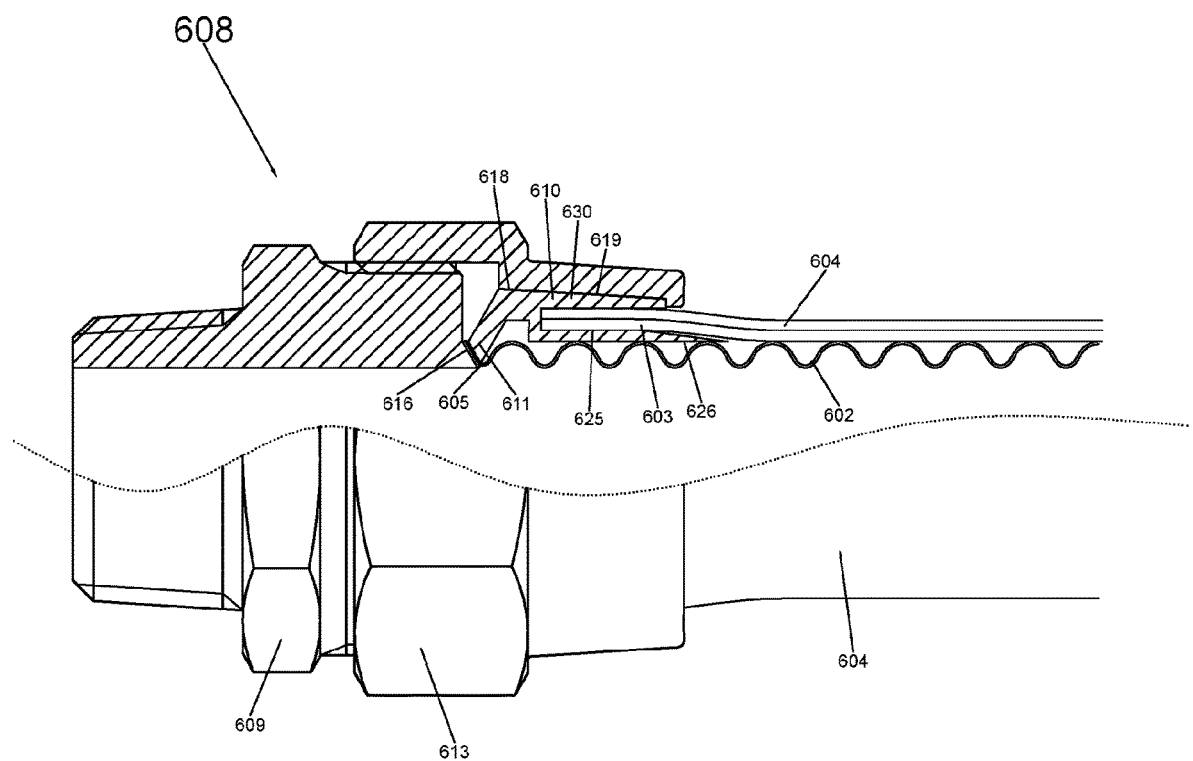
FIG. 14F shows a partially cross-sectional side view of a seventh embodiment of a connector assembly in an assembled state around the tubing having a metallic braded layer and an outer plastic layer, in accordance with the first and second aspect of the present invention.

Optionally, the sheath-contact ring 623 and the corrugated-element engagement part 630 may be formed from the same piece rather than separate pieces, as depicted in FIG. 14F Here, the collet 610 includes a sheath contact portion 625 consisting of at least one axially extending tail positionable between the inner corrugated element 602 and the flexible sheath layer 603 of the reinforced corrugated tubing 601, in use. The sheath-contact portion 625 may have a tapered distal end or axially extending tail 626 to facilitate insertion of the sheath-contact portion 625 between the inner corrugated element 602 and the sheath layer 603 of the corrugated tubing.

Advantageously, the connector assembly may be formed from the same or similar metal as used for the metal braid. The connector assembly may be manufactured from brass, while the braid may be formed from copper or brass strands.

As brass is largely composed of copper, a brass connector assembly combined with a copper braid (or vice versa) will significantly prevent galvanic corrosion verses other metallic combinations such as brass and aluminum.

Optionally, the braid layer in all embodiments may be formed from a non metallic braid, such as a nylon braid. This may be advantageous for plumbing applications where reinforcing of the corrugated tubing is desirable, but where enhanced electrical conductivity of the tubing is not required or undesirable.

Advantageously, the braid layer in all embodiments could be made from a combination of nylon or polymer strands, interlaced with metal strands. In this way the braided layer will be less expensive to manufacturer as well as easier to fold over, but may still have enough metal strands in order to adequately enhance the electrical conductivity of the installed pipework.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various changes and modifications will be apparent to persons skilled in the art without departing from the scope of the present invention as defined by the appended claims.

The invention claimed is:

1. A method of connecting corrugated tubing having an inner corrugated element and an outer flexible sheath layer, the outer flexible sheath layer comprising an inner electrically conductive sublayer and an outer electrically insulative sublayer, the method comprising the steps of:
   a] placing a connector around the corrugated tubing;
   b] folding back portion of the outer flexible sheath layer from one end to expose a portion of the inner corrugated element and to expose a portion of the inner electrically conductive sublayer at an outer surface of the outer flexible sheath layer;
   c] placing a collet partly over the outer flexible sheath layer, a radially inward protruding clamping element of the collet protruding into a trough of the exposed portion of the inner corrugated element, and a sheath-contact portion of the collet engaging said portion of the inner electrically conductive sublayer of the outer flexible sheath layer;
   d] engaging a fitting including a fluid-flow passage with the connector; and
   e] moving the fitting relative to the connector so that the radially inward protruding clamping element causes the inner corrugated element to contact an abutment surface of the fitting, the sheath-contact portion of the collet maintaining engagement with said portion of the inner electrically conductive sublayer of the outer flexible sheath layer.

2. The method as claimed in claim 1, further comprising a step f] prior to step a] of cutting the corrugated tubing.

3. The method as claimed in claim 1, further comprising a step g] prior to step b] of making an axial slit on the outer electrically insulative sublayer at said portion of the outer flexible sheath layer to aid the folding back of said portion of the outer flexible sheath layer.

4. The method as claimed in claim 1, wherein in step c] the sheath-contact portion of the collet overlies the entire or at least a part of said portion of the inner electrically conductive sublayer of the outer flexible sheath layer.

5. The method as claimed in claim 1, wherein in step b] said portion of the inner electrically conductive sublayer overlies a plurality of peaks and/or troughs of the inner corrugated element.

6. The method as claimed in claim 1, wherein in step d] the connector overlies an entire axial extent of the collet.

7. The method as claimed in claim 1, wherein in step d] the fitting overlies a portion of the collet and the connector overlies a remaining portion of the collet.

8. The method as claimed in claim 7, wherein one end of the fluid-flow passage of the fitting which is proximal to the connector is wider than that of the other end of the fluid-flow passage to accommodate the collet therein.

9. The method as claimed in claim 1, wherein in step e] at least the fitting and the collet define at least in part an electrically conductive path to the sheath-contact portion.

10. The method as claimed in claim 1, wherein the inner electrically conductive sublayer is braided and has a loose configuration of strands.

11. The method as claimed in claim 10, wherein the strands include nylon strands and/or metal strands.

12. The method as claimed in claim 1, wherein the inner electrically conductive sublayer includes metal and can be cut by a pipe cutter.

13. The method as claimed in claim 12, wherein the metal includes brass or copper.

14. The method as claimed in claim 1, wherein the collet is of at least two parts, each part defining a portion of a perimeter of the collet.

15. The method as claimed in claim 1, wherein the connector includes an inner surface for receiving the collet, opposing surfaces of the connector and collet defining a tapered interengagement.

16. A connector assembly for connecting corrugated tubing having an inner corrugated element and an outer flexible sheath layer, the outer flexible sheath layer comprising an inner electrically conductive sublayer and an outer electrically insulative sublayer, the connection being achieved by the steps of:
   placing a connector around the corrugated tubing;
   folding back a portion of the outer flexible sheath layer from one end to expose a portion of the inner corrugated element and to expose a portion of the inner electrically conductive sublayer at an outer surface of the outer flexible sheath layer;
   placing a collet partly over the outer flexible sheath layer, a radially inward protruding clamping element of the collet protruding into a trough of the exposed portion of the inner corrugated element, and a sheath-contact portion of the collet engaging said portion of the inner electrically conductive sublayer of the outer flexible sheath layer;
   engaging a fitting including a fluid-flow passage with the connector; and
   moving the fitting relative to the connector so that the radially inward protruding clamping element causes the inner corrugated element to contact an abutment surface of the fitting, the sheath-contact portion of the collet maintaining engagement with said portion of the inner electrically conductive sublayer of the outer flexible sheath layer.

\* \* \* \* \*